US012441189B2

(12) United States Patent
Badar et al.

(10) Patent No.: US 12,441,189 B2
(45) Date of Patent: Oct. 14, 2025

(54) FRAME FOR AUTO INTERIOR DISPLAY PANEL

(71) Applicant: CORNING INCORPORATED, Corning, NY (US)

(72) Inventors: Amey Ganpat Badar, Corning, NY (US); Timothy Michael Gross, Corning, NY (US); Khaled Layouni, Fontainebleau (FR); Torsten Nath, Berlin (DE); Jong Se Park, Horseheads, NY (US); Michael William Price, Corning, NY (US); Yousef Kayed Qaroush, Painted Post, NY (US); Yang Yang, Windsor Mill, MD (US)

(73) Assignee: CORNING INCORPORATED, Corning, NY (US)

(*) Notice: Subject to any disclaimer, the term of this patent is extended or adjusted under 35 U.S.C. 154(b) by 584 days.

(21) Appl. No.: 17/286,132

(22) PCT Filed: Oct. 15, 2019

(86) PCT No.: PCT/US2019/056191
§ 371 (c)(1),
(2) Date: Apr. 16, 2021

(87) PCT Pub. No.: WO2020/081488
PCT Pub. Date: Apr. 23, 2020

(65) Prior Publication Data
US 2021/0370774 A1  Dec. 2, 2021

Related U.S. Application Data

(60) Provisional application No. 62/842,885, filed on May 3, 2019, provisional application No. 62/747,545, filed on Oct. 18, 2018.

(51) Int. Cl.
B60K 35/00 (2024.01)
B60K 35/50 (2024.01)

(52) U.S. Cl.
CPC .............. *B60K 35/00* (2013.01); *B60K 35/50* (2024.01); *B60K 2360/652* (2024.01);
(Continued)

(58) Field of Classification Search
CPC ...... B60K 2370/152; B60K 2370/1529; B60K 2370/80; B60K 2370/816; B60K 35/00;
(Continued)

(56) References Cited

U.S. PATENT DOCUMENTS 4,455,338 A   6/1984 Henne
4,899,507 A   2/1990 Mairlot
(Continued)

FOREIGN PATENT DOCUMENTS

CN  102566841 A  7/2012
CN  203825589 U  9/2014
(Continued)

OTHER PUBLICATIONS

Wikipedia (https://en.wikipedia.org/w/index.php?title=Second_moment_of_area&oldid=773077336) (Year: 2017).*
(Continued)

*Primary Examiner* — Michael H Caley
*Assistant Examiner* — David Y Chung
(74) *Attorney, Agent, or Firm* — Daniel J. Greenhalgh

(57) ABSTRACT

An automotive display module can include a mounting bracket, a display panel, a cover substrate, and a frame member. The mounting bracket can be securable to a component of an automobile. The display panel can be coupled to the mounting bracket and the frame member can be connected to a back side of the cover substrate.

15 Claims, 13 Drawing Sheets

(52) U.S. Cl.
CPC .. *B60K 2360/688* (2024.01); *B60K 2360/691* (2024.01); *B60K 2360/693* (2024.01); *B60K 2360/822* (2024.01)

(58) Field of Classification Search
CPC .............. B60K 35/50; B60K 2360/822; B60K 2360/652; B60K 2360/691; B60K 2360/688; B60K 2360/693
See application file for complete search history.

(56) References Cited

U.S. PATENT DOCUMENTS

| | | | |
|---|---|---|---|
| 4,985,099 | A | 1/1991 | Mertens et al. |
| 6,086,983 | A | 7/2000 | Yoshizawa |
| 6,198,522 | B1 * | 3/2001 | Yanagi ................ G02F 1/13452 349/149 |
| 6,332,690 | B1 | 12/2001 | Murofushi |
| 6,582,799 | B1 | 6/2003 | Brown et al. |
| 7,375,782 | B2 | 5/2008 | Yamazaki et al. |
| 8,344,369 | B2 | 1/2013 | Yamazaki et al. |
| 8,549,885 | B2 | 10/2013 | Dannoux et al. |
| 8,833,106 | B2 | 9/2014 | Dannoux et al. |
| 8,912,447 | B2 | 12/2014 | Leong et al. |
| 9,061,934 | B2 | 6/2015 | Bisson et al. |
| 9,487,157 | B1 | 11/2016 | Vinton |
| 9,593,042 | B2 | 3/2017 | Hu et al. |
| 9,802,485 | B2 | 10/2017 | Masuda et al. |
| 9,895,975 | B2 | 2/2018 | Lee et al. |
| 9,902,640 | B2 | 2/2018 | Dannoux et al. |
| 9,931,817 | B2 | 4/2018 | Rickerl |
| 10,131,118 | B2 | 11/2018 | Kang et al. |
| 10,450,218 | B2 | 10/2019 | Hashimoto et al. |
| 2003/0170450 | A1 * | 9/2003 | Stewart .................. H05K 3/305 428/347 |
| 2007/0223121 | A1 | 9/2007 | Franck et al. |
| 2009/0179840 | A1 | 7/2009 | Tanaka et al. |
| 2009/0185127 | A1 | 7/2009 | Tanaka et al. |
| 2010/0031590 | A1 | 2/2010 | Buchwald et al. |
| 2012/0202030 | A1 | 8/2012 | Kondo et al. |
| 2013/0088441 | A1 | 4/2013 | Chung et al. |
| 2014/0118910 | A1 * | 5/2014 | Sung ................. G02F 1/133305 361/679.01 |
| 2014/0340611 | A1 | 11/2014 | Mori et al. |
| 2015/0246507 | A1 | 9/2015 | Brown et al. |
| 2016/0297176 | A1 | 10/2016 | Rickerl |
| 2016/0306451 | A1 | 10/2016 | Isoda et al. |
| 2016/0375808 | A1 | 12/2016 | Etienne et al. |
| 2017/0008377 | A1 | 1/2017 | Fisher et al. |
| 2017/0021661 | A1 | 1/2017 | Pelucchi |
| 2017/0327402 | A1 | 11/2017 | Fujii et al. |
| 2017/0349473 | A1 | 12/2017 | Moriya et al. |
| 2018/0050948 | A1 | 2/2018 | Faik et al. |
| 2018/0065881 | A1 * | 3/2018 | Hashimoto .............. B32B 17/06 |
| 2018/0111569 | A1 | 4/2018 | Faik et al. |
| 2018/0147985 | A1 | 5/2018 | Brown et al. |
| 2018/0149777 | A1 | 5/2018 | Brown |
| 2018/0149907 | A1 | 5/2018 | Gahagan et al. |
| 2018/0188869 | A1 | 7/2018 | Boggs et al. |
| 2018/0210118 | A1 | 7/2018 | Gollier et al. |
| 2018/0245125 | A1 | 8/2018 | Tsai et al. |
| 2018/0356928 | A1 * | 12/2018 | Ao ........................ G06F 1/1626 |
| 2019/0375673 | A1 * | 12/2019 | Hashimoto .............. C03C 3/093 |

FOREIGN PATENT DOCUMENTS

| | | | |
|---|---|---|---|
| CN | 104679341 | A | 6/2015 |
| CN | 204463066 | U | 7/2015 |
| CN | 104843976 | A | 8/2015 |
| CN | 105358359 | A | 2/2016 |
| CN | 105511127 | A | 4/2016 |
| CN | 106945524 | A * | 7/2017 ............ B60K 35/00 |
| DE | 4415878 | A1 | 11/1995 |
| DE | 102004022008 | A1 | 12/2004 |
| DE | 102013214108 | A1 | 2/2015 |
| DE | 102016004533 | A1 | 2/2017 |
| DE | 102015226025 | A1 | 6/2017 |
| FR | 2918411 | A1 | 1/2009 |
| GB | 2011316 | A | 7/1979 |
| JP | 11-060293 | A | 3/1999 |
| JP | 3059337 | B2 | 7/2000 |
| JP | 2003-500260 | A | 1/2003 |
| JP | 2010-009066 | A | 1/2010 |
| JP | 2013-084269 | A | 5/2013 |
| JP | 2015-092422 | A | 5/2015 |
| JP | 5748082 | B2 | 7/2015 |
| JP | 2016-031696 | A | 3/2016 |
| JP | 5976561 | B2 | 8/2016 |
| JP | 2016-173794 | A | 9/2016 |
| JP | 2016-203609 | A | 12/2016 |
| JP | 2016-207200 | A | 12/2016 |
| KR | 10-2016-0144008 | A | 12/2016 |
| WO | 98/01649 | A1 | 1/1998 |
| WO | 2000/073062 | A1 | 12/2000 |
| WO | 2007/108861 | A1 | 9/2007 |
| WO | 2012/058084 | A2 | 5/2012 |
| WO | 2014/102467 | A1 | 7/2014 |
| WO | 2014/175371 | A1 | 10/2014 |
| WO | 2015/031594 | A2 | 3/2015 |
| WO | 2016/044360 | A1 | 3/2016 |
| WO | 2016/125713 | A1 | 8/2016 |
| WO | 2016/136758 | A1 | 9/2016 |
| WO | 2016/196531 | A1 | 12/2016 |
| WO | 2016/196546 | A1 | 12/2016 |
| WO | 2017/155932 | A1 | 9/2017 |
| WO | 2018/005646 | A1 | 1/2018 |
| WO | 2018/009504 | A1 | 1/2018 |
| WO | 2018/075853 | A1 | 4/2018 |
| WO | 2018/081068 | A1 | 5/2018 |
| WO | 2018/125683 | A1 | 7/2018 |

OTHER PUBLICATIONS

Espacenet English machine translation of CN106945524A (Year: 2017).*
Abramowicz, W., and N. Jones. "Transition from initial global bending to progressive buckling of tubes loaded statically and dynamically." International Journal of Impact Engineering 19, No. 5-6 (1997): 415-437.
Alexander, J. M. "An approximate analysis of the collapse of thin cylindrical shells under axial loading." The Quarterly Journal of Mechanics and Applied Mathematics 13, No. 1 (1960): 10-15.
Alghamdi, A. A. A. "Collapsible impact energy absorbers: an overview." Thin-walled structures 39, No. 2 (2001): 189-213.
International Search Report and Written Opinion of the International Searching Authority; PCT/US2018/012215 Dated Aug. 1, 2018; 21 Pgs; European Patent Office.
International Search Report and Written Opinion of the International Searching Authority; PCT/US2018/041062 Dated Nov. 13, 2018; 15 Pgs; European Patent Office.
Invitation to Pay Additional Fees of the International Searching Authority; PCT/US2018/012215; Mailed May 11, 2018; 13 Pages; European Patent Office.
Sadeghi, M. M. "Design of heavy duty energy absorbers." Structural Impact and Crashworthiness, vol. 2, 1984, pp. 588-604.
International Search Report and Written Opinion of the International Searching Authority; PCT/US19/056191; Mailed Dec. 13, 2019; 8 Pages; European Property Office.
Chinese Patent Application No. 201980078600.0, Office Action dated Dec. 26, 2023, 4 pages (English Translation only), Chinese Patent Office.

* cited by examiner

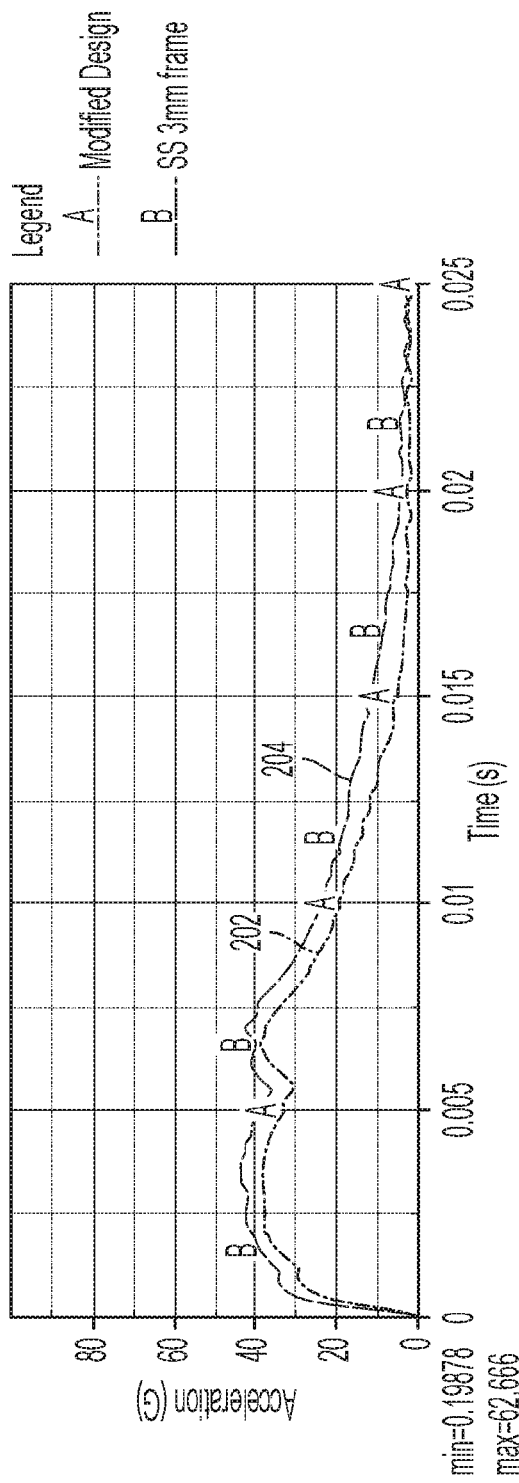
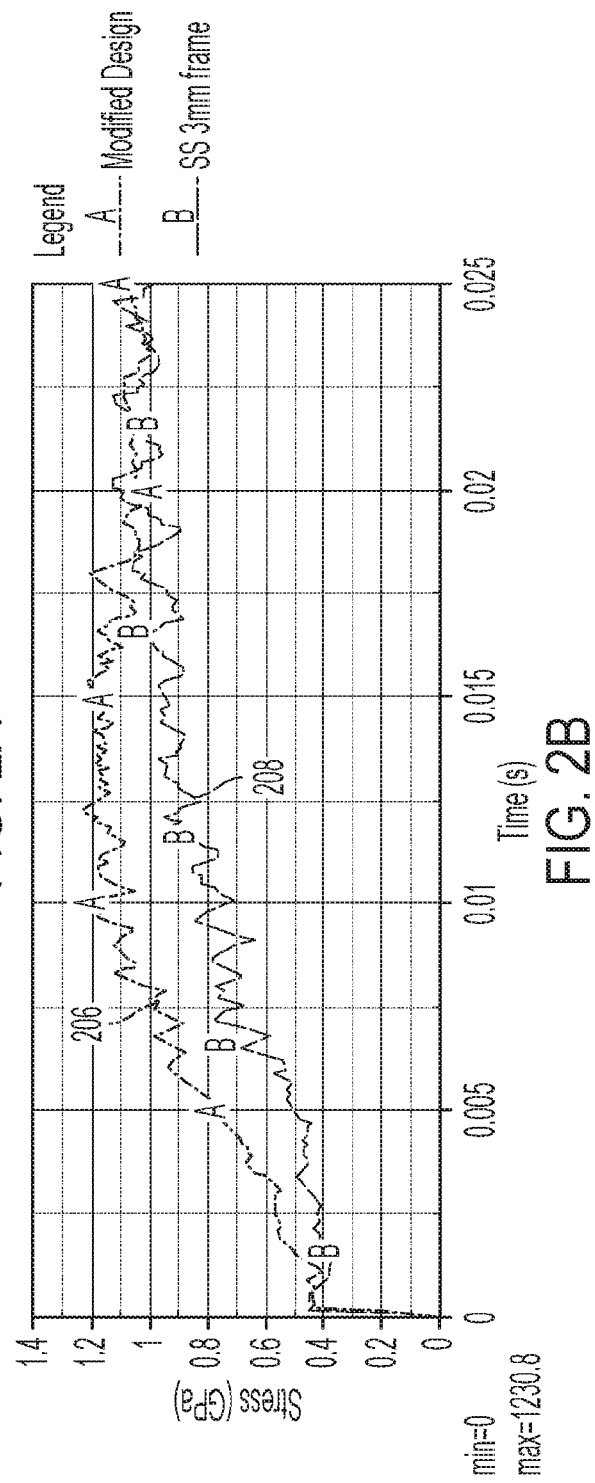

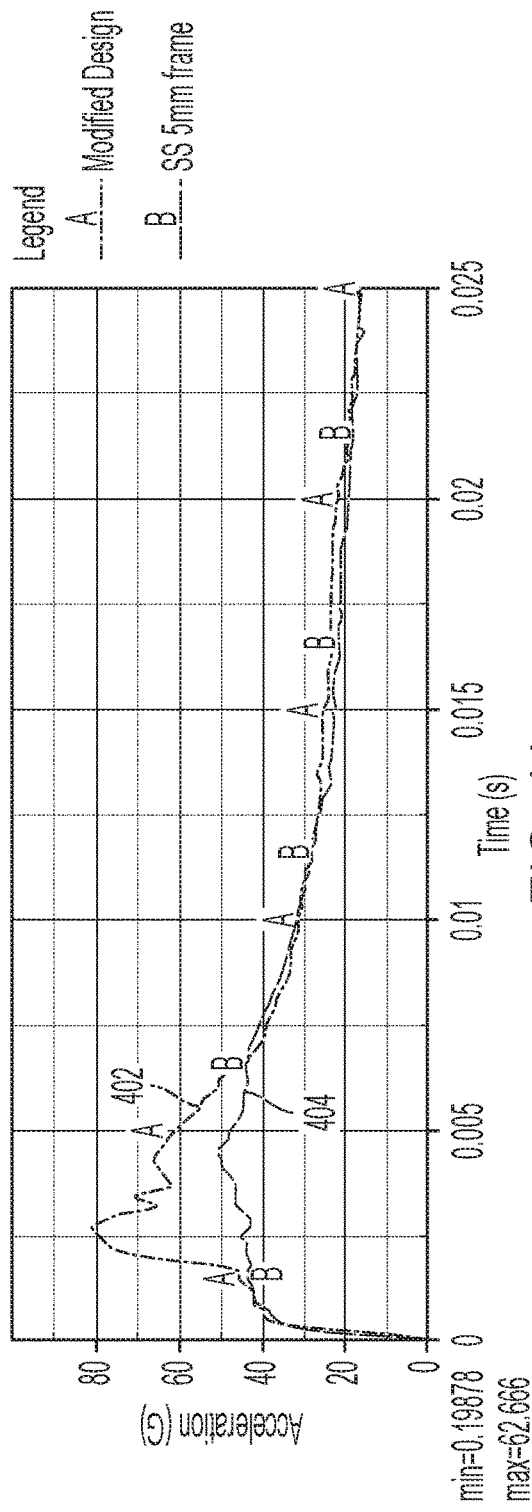
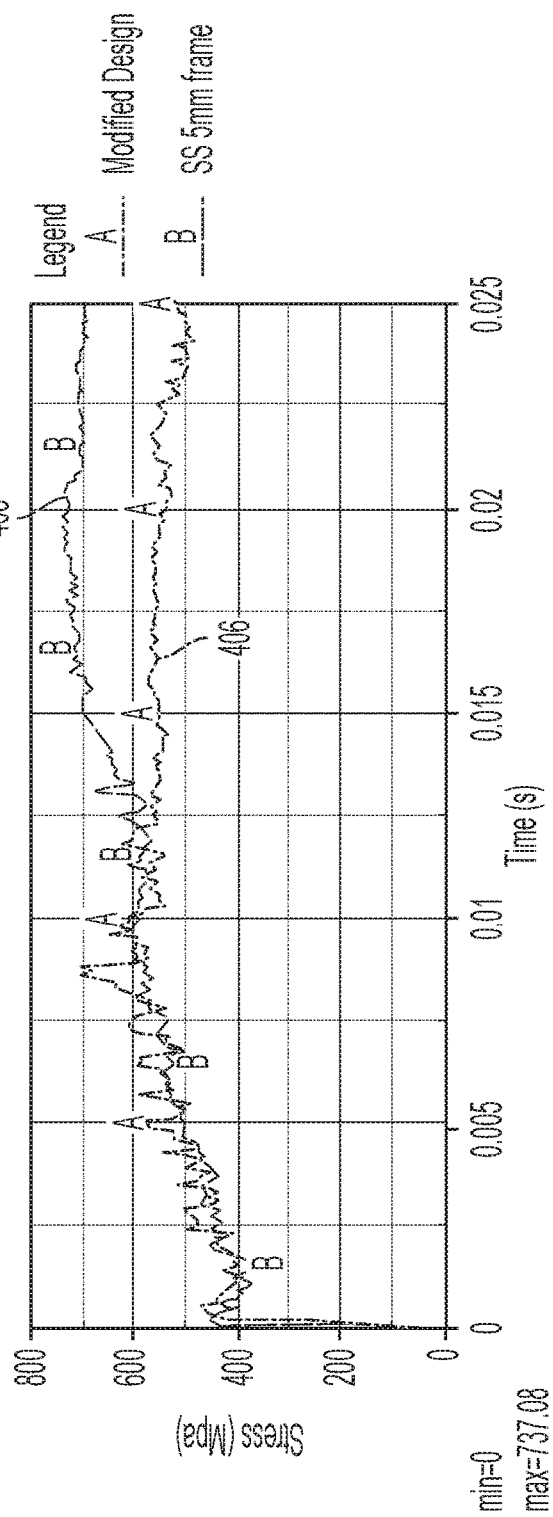
FIG. 4A
FIG. 4B

FRAME FOR AUTO INTERIOR DISPLAY PANEL

CROSS-REFERENCE TO RELATED APPLICATIONS

This application claims the benefit of priority under 35 U.S.C. § 119 of U.S. Provisional Application Ser. No. 62/842,885 filed on May 3, 2019 and U.S. Provisional Application Ser. No. 62/747,545 filed on Oct. 18, 2018, the content of which are relied upon and incorporated herein by reference in their entirety.

BACKGROUND

In the automotive industry, car crashes or car accidents are an everyday occurrence in the United States and internationally. During an impact of an accident, severe injuries can occur if a head of a driver or passenger impacts interior structures, such as display modules. Accordingly, attention has been drawn to improving structural crashworthiness, response of a vehicle involved in or experiencing an impact, to reduce occupant fatalities and injuries.

BRIEF DESCRIPTION OF THE DRAWINGS

In the drawings, which are not necessarily drawn to scale, like numerals may describe similar components in different views. Like numerals having different letter suffixes may represent different instances of similar components. The drawings illustrate generally, by way of example, but not by way of limitation, various embodiments discussed in the present document.

FIG. 2A illustrates a graph showing impact performance of two automotive display modules, in accordance with at least one example of this disclosure.

FIG. 2B illustrates a graph showing impact performance of two automotive display modules, in accordance with at least one example of this disclosure.

FIG. 4A illustrates a graph showing impact performance of two automotive display modules, in accordance with at least one example of this disclosure.

FIG. 4B illustrates a graph showing impact performance of two automotive display modules, in accordance with at least one example of this disclosure.

DETAILED DESCRIPTION

Figure 1:
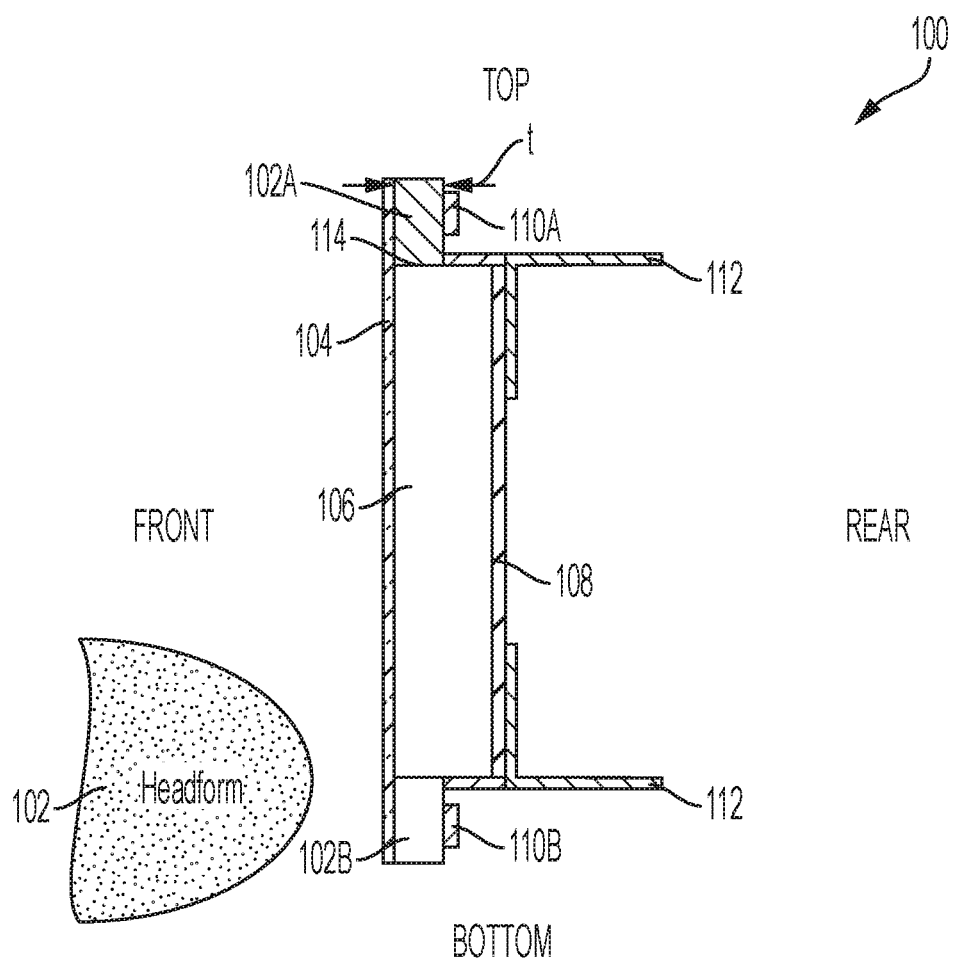
FIG. 1 illustrates a cross-section side view of an automotive display module, in accordance with at least one example of this disclosure.

Improving structural crashworthiness to reduce occupant fatalities and injuries is an important and ongoing process. Because electronics, especially large touch-sensitive displays, are being incorporated into automobiles, the crashworthiness of large display modules is a relatively new area of focus. A headform impact test (HIT) is a mandatory regulation in the automotive sector under Federal Motor Vehicle Safety Standards (FMVSS) 201. The HIT under FMVSS 201 is used to simulate passenger head impact on dashboard and adjacent areas in the event of crash. According to this test, any display mounted on the dashboard must pass the criteria for HIT, which includes a requirement of continuous 3 millisecond head deceleration of not more than 80 times gravitational force (G).

In addition to meeting these requirements, it is desirable to reduce stress in glass coverings caused by an impact to help reduce the likelihood of breaking glass, because broken glass can cause secondary injuries to occupants of a vehicle during a crash, such as lacerations from fragments of broken glass. It is therefore important to determine an optimal display module approach that can protect occupants from primary impact and secondary injury during crashes. This disclosure addresses these problems by providing a cover substrate attached to a metal frame using an adhesive.

Cold-forming is a relatively new method of making display panels for automobile interiors and as such remains a substantially unexplored area especially for impact tests. Use of cold-formed glass with supportive structures, such as described in this disclosure, helps to provide a means to absorb kinetic energy of an impact and helps to prevent cover substrate failure due to local bending of the cover substrate, especially on unsupported edges of the cover substrate. This disclosure discusses use of frames of two-dimensional (flat) and three-dimensional (curved) geometries to improve cover substrate module performance under HIT and to help prevent passenger injury and lacerations.

In some examples, the components of a display module are grouped into four main structures. The cover substrate, adhesives, back structure (housing), and supports (frame, etc.). The back structure typically contains a liquid crystal display panels, one or more touch pads, circular boards, display frames, and housings, the structure of which are not intended to receive or dissipate forces, and design of which typically vary subject to manufacturer specifications. As such, the properties of the housing and supports dominate the dynamic responses of a headform-induced cover substrate stress.

In an example, a cover substrate can be secured to a frame using an adhesive, where the adhesive and frame can help maintain the cover substrate in a curved configuration, when desired. A display can be mounted behind the glass and within an opening of the frame. Additional structure such as a housing and brackets can be used to secure the frame, glass, and display to an automobile. Each component can be optimized to reduce glass stress while helping ensure that head deceleration not exceed 80G for 3 milliseconds and helping to enable the cover substrate to maintain its integrity during and after impact. The frame material, frame geometry, and frame thickness each affect the display performance under HIT, and therefore can be optimized to help reduce stress and acceleration. In some examples, the frame can include ribs to help transfer impact energy to supporting brackets, thereby helping to direct a bulk of energy away from the cover substrate.

Also, it is important for the total weight of the display to be as low as possible for ease of installation, handling, and fuel economy. This disclosure also provides a solution to improve the performance of the frame under HIT while keeping the weight relatively low and maintaining a necessary stiffness for normal use of the display.

FIG. 1 illustrates a cross-section side view of an automotive display module 100 and a headform 102, in accordance with at least one example of this disclosure. The automotive display 100 can include a frame 102 (including a top frame member 102A and a bottom frame member 102B) a cover substrate 104, a display panel 106, a housing 108 (or back cover), ribs 110A and 110B (collectively referred to as ribs 110), and brackets 112. FIG. 1 also shows thickness "t" and orientation indicators Top, Bottom, Front, and Rear.

The headform 102 can be similar to a headform used for testing that is compliant with FMVSS 201. In such testing, the headform is typically 165 mm in diameter and has a mass of about 6.8 kg. The headform 102 can be configured to impact the display module 100 at different angles and typically at a speed of 6.67 meters per second. The total impact energy can be around 152 Joules.

The frame 102 (including the top member 102A and the bottom member 102B) can be one or more rigid or semi-rigid members defining an opening 114 therein, where the opening can be sized to receive and retain the display panel 106, with the frame substantially surrounding a periphery of the display panel 106. In some examples, the frame 102 can be a single component, such as a three dimensionally printed frame or a machined frame. In other examples, the frame 102 can be made of multiple pieces such as a frame made of welded tube members. Other methods of fastening the frame members can also be used.

The frame 102 can be made of one or more materials such as one or more metals, plastics, foams, elastomers, ceramics, composites, one or more combinations thereof, or the like. In some examples, the frame 102 can be made of a material having a high yield strength, such as one or more of a stainless-steel alloy, titanium, aluminum, reinforced glass fiber, carbon fiber, or the like. In some examples, the frame can be made of one or more ferritic, austenitic, and duplex stainless-steels, carbon steels, galvanized carbon steels, aluminum alloys, magnesium alloys, or the like.

The frame members 110A and 110B can each have the thickness t. In some examples, the frame member 110A can have a front-to-back thickness t between about 0.5 millimeters and about 7.5 millimeters. In some examples, the thickness t can be between about 3 millimeters and about 5 millimeters. Such thicknesses can help provide absorption of impact energy to help reduce stress of the cover substrate during impact and while also maintaining headform acceleration at acceptable levels. In some examples, the thickness of the frame 102 can be consistent through a length of the frame 102 and in other examples, the thickness t can vary along the length.

The cover substrate 104 can be a clear, chemically strengthened glass configured to protect the display panel while still allowing touch interaction with the display panel 106 or touch-panel thereof. In some examples, the cover substrate 104 may include an inorganic material and may include an amorphous substrate, a crystalline substrate or a combination thereof. The cover substrate may be formed from man-made materials and/or naturally occurring materials (e.g., quartz and polymers). For example, in some instances, the cover substrate may be characterized as organic and may specifically be polymeric. Examples of suitable polymers include, without limitation: thermoplastics including polystyrene (PS) (including styrene copolymers and blends), polycarbonate (PC) (including copolymers and blends), polyesters (including copolymers and blends, including polyethyleneterephthalate and polyethyleneterephthalate copolymers), polyolefins (PO) and cyclicpolyolefins (cyclic-PO), polyvinylchloride (PVC), acrylic polymers including polymethyl methacrylate (PMMA) (including copolymers and blends), thermoplastic urethanes (TPU), polyetherimide (PEI) and blends of these polymers with each other. Other exemplary polymers include epoxy, styrenic, phenolic, melamine, and silicone resins.

In some specific embodiments, the cover substrate may specifically exclude polymeric, plastic and/or metal substrates. In one or more embodiments, the substrate exhibits a refractive index in the range from about 1.45 to about 1.55. In specific embodiments, the cover substrate may exhibit an average strain-to-failure at a surface on one or more opposing major surface of the cover glass that is 0.5% or greater, 0.6% or greater, 0.7% or greater, 0.8% or greater, 0.9% or greater, 1% or greater, 1.1% or greater, 1.2% or greater, 1.3% or greater, 1.4% or greater 1.5% or greater or even 2% or greater, as measured using ball-on-ring testing using at least 5, at least 10, at least 15, or at least 20 samples. In specific embodiments, the cover substrate may exhibit an average strain-to-failure at its surface on one or more opposing major surface of about 1.2%, about 1.4%, about 1.6%, about 1.8%, about 2.2%, about 2.4%, about 2.6%, about 2.8%, or about 3% or greater.

Suitable cover substrates may exhibit an elastic modulus (or Young's modulus) in the range from about 30 GPa to about 120 GPa. In some instances, the elastic modulus of the substrate may be in the range from about 30 GPa to about 110 GPa, from about 30 GPa to about 100 GPa, from about 30 GPa to about 90 GPa, from about 30 GPa to about 80 GPa, from about 30 GPa to about 70 GPa, from about 40 GPa to about 120 GPa, from about 50 GPa to about 120 GPa, from about 60 GPa to about 120 GPa, from about 70 GPa to about 120 GPa, and all ranges and sub-ranges therebetween.

In one or more embodiments, the cover substrates may include an amorphous substrate, which may include a glass article. The glass article may be strengthened or non-strengthened. Examples of suitable glass composition families used to form the glass articles include soda lime glass, alkali aluminosilicate glass, alkali containing borosilicate glass and alkali aluminoborosilicate glass. In one or more alternative embodiments, the cover substrate may include crystalline substrates such as glass ceramic article (which may be strengthened or non-strengthened) or may include a single crystal structure, such as sapphire. In one or more specific embodiments, the cover substrate includes an amorphous base (e.g., glass) and a crystalline cladding (e.g., sapphire layer, a polycrystalline alumina layer and/or or a spinel ($MgAl_2O_4$) layer).

The cover substrate may be substantially sheet-like, although other embodiments may utilize a curved or otherwise shaped or sculpted substrate. The cover substrate may be substantially optically clear, transparent and free from light scattering. In such embodiments, the cover substrate may exhibit an average light transmission over the optical wavelength regime of about 85% or greater, about 86% or greater, about 87% or greater, about 88% or greater, about 89% or greater, about 90% or greater, about 91% or greater or about 92% or greater. In one or more alternative embodiments, the cover substrate may be opaque or exhibit an average light transmission over the optical wavelength regime of less than about 10%, less than about 9%, less than about 8%, less than about 7%, less than about 6%, less than about 5%, less than about 4%, less than about 3%, less than about 2%, less than about 1%, or less than about 0%. In some embodiments, these light transmittance values are total transmittance values (taking into account transmittance through both major surfaces of the substrate) The substrate 110 may optionally exhibit a color, such as white, black, red, blue, green, yellow, orange etc.

In one or more embodiments, the cover substrate 104 has a first major surface, second major surface opposing the first major surface and a minor surface connecting the first major surface and the second major surface, a thickness defined as a distance between the first major surface and the second major surface, a width defined as a first dimension of one of the first or second major surfaces orthogonal to the thickness, and a length defined as a second dimension of one of the first or second major surfaces orthogonal to both the thickness and the width. As used herein, thickness as used herein refers to the maximum thickness of the cover substrate.

In one or more embodiments, the cover substrate has a thickness that is about 1.5 mm or less. In one or embodiments, the cover substrate has a thickness that is greater than about 0.125 mm (e.g., about 0.13 mm or greater, about 0.13 mm or greater, about 0.13 mm or greater, about 0.13 mm or greater, about 0.13 mm or greater, about 0.13 mm or greater, about 0.13 mm or greater, about 0.13 mm or greater, about 0.13 mm or greater, about 0.13 mm or greater, about 0.13 mm or greater, about 0.13 mm or greater, about 0.13 mm or greater, about 0.13 mm or greater, about 0.13 mm or greater, about 0.13 mm or greater, For example, the thickness may be in a range from about 0.01 mm to about 1.5 mm, 0.02 mm to about 1.5 mm, 0.03 mm to about 1.5 mm, 0.04 mm to about 1.5 mm, 0.05 mm to about 1.5 mm, 0.06 mm to about 1.5 mm, 0.07 mm to about 1.5 mm, 0.08 mm to about 1.5 mm, 0.09 mm to about 1.5 mm, 0.1 mm to about 1.5 mm, from about 0.15 mm to about 1.5 mm, from about 0.2 mm to about 1.5 mm, from about 0.25 mm to about 1.5 mm, from about 0.3 mm to about 1.5 mm, from about 0.35 mm to about 1.5 mm, from about 0.4 mm to about 1.5 mm, from about 0.45 mm to about 1.5 mm, from about 0.5 mm to about 1.5 mm, from about 0.55 mm to about 1.5 mm, from about 0.6 mm to about 1.5 mm, from about 0.65 mm to about 1.5 mm, from about 0.7 mm to about 1.5 mm, from about 0.01 mm to about 1.4 mm, from about 0.01 mm to about 1.3 mm, from about 0.01 mm to about 1.2 mm, from about 0.01 mm to about 1.1 mm, from about 0.01 mm to about 1.05 mm, from about 0.01 mm to about 1 mm, from about 0.01 mm to about 0.95 mm, from about 0.01 mm to about 0.9 mm, from about 0.01 mm to about 0.85 mm, from about 0.01 mm to about 0.8 mm, from about 0.01 mm to about 0.75 mm, from about 0.01 mm to about 0.7 mm, from about 0.01 mm to about 0.65 mm, from about 0.01 mm to about 0.6 mm, from about 0.01 mm to about 0.55 mm, from about 0.01 mm to about 0.5 mm, from about 0.01 mm to about 0.4 mm, from about 0.01 mm to about 0.3 mm, from about 0.01 mm to about 0.2 mm, from about 0.01 mm to about 0.1 mm, from about 0.04 mm to about 0.07 mm, from about 0.1 mm to about 1.4 mm, from about 0.1 mm to about 1.3 mm, from about 0.1 mm to about 1.2 mm, from about 0.1 mm to about 1.1 mm, from about 0.1 mm to about 1.05 mm, from about 0.1 mm to about 1 mm, from about 0.1 mm to about 0.95 mm, from about 0.1 mm to about 0.9 mm, from about 0.1 mm to about 0.85 mm, from about 0.1 mm to about 0.8 mm, from about 0.1 mm to about 0.75 mm, from about 0.1 mm to about 0.7 mm, from about 0.1 mm to about 0.65 mm, from about 0.1 mm to about 0.6 mm, from about 0.1 mm to about 0.55 mm, from about 0.1 mm to about 0.5 mm, from about 0.1 mm to about 0.4 mm, or from about 0.3 mm to about 0.7 mm.

In one or more embodiments, the thickness of the cover substrate is substantially uniform in that it the bend axis has substantially the same thickness as other portions of the cover substrate. For example, the thickness of the cover substrate does not vary by more than ±10%, 5% or 2% across the total surface area of the first major surface, the second major surface or both the first and second major surfaces. In one or more embodiments, the thickness is substantially constant (within ±1% of the average thickness) across 90%, 95% or 99% of the total surface area of the first major surface, the second major surface or both the first and second major surfaces.

In one or more embodiments, the cover substrate has a width in a range from about 5 cm to about 250 cm, from about 10 cm to about 250 cm, from about 15 cm to about 250 cm, from about 20 cm to about 250 cm, from about 25 cm to about 250 cm, from about 30 cm to about 250 cm, from about 35 cm to about 250 cm, from about 40 cm to about 250 cm, from about 45 cm to about 250 cm, from about 50 cm to about 250 cm, from about 55 cm to about 250 cm, from about 60 cm to about 250 cm, from about 65 cm to about 250 cm, from about 70 cm to about 250 cm, from about 75 cm to about 250 cm, from about 80 cm to about 250 cm, from about 85 cm to about 250 cm, from about 90 cm to about 250 cm, from about 95 cm to about 250 cm, from about 100 cm to about 250 cm, from about 110 cm to about 250 cm, from about 120 cm to about 250 cm, from about 130 cm to about 250 cm, from about 140 cm to about 250 cm, from about 150 cm to about 250 cm, from about 5 cm to about 240 cm, from about 5 cm to about 230 cm, from about 5 cm to about 220 cm, from about 5 cm to about 210 cm, from about 5 cm to about 200 cm, from about 5 cm to about 190 cm, from about 5 cm to about 180 cm, from about 5 cm to about 170 cm, from about 5 cm to about 160 cm, from about 5 cm to about 150 cm, from about 5 cm to about 140 cm, from about 5 cm to about 130 cm, from about 5 cm to about 120 cm, from about 5 cm to about 110 cm, from about 5 cm to about 110 cm, from about 5 cm to about 100 cm, from about 5 cm to about 90 cm, from about 5 cm to about 80 cm, or from about 5 cm to about 75 cm.

In one or more embodiments, the cover substrate has a length zin a range from about 5 cm to about 250 cm, from about 10 cm to about 250 cm, from about 15 cm to about 250 cm, from about 20 cm to about 250 cm, from about 25 cm to about 250 cm, from about 30 cm to about 250 cm, from about 35 cm to about 250 cm, from about 40 cm to about 250 cm, from about 45 cm to about 250 cm, from about 50 cm to about 250 cm, from about 55 cm to about 250 cm, from about 60 cm to about 250 cm, from about 65 cm to about 250 cm, from about 70 cm to about 250 cm, from about 75 cm to about 250 cm, from about 80 cm to about 250 cm, from about 85 cm to about 250 cm, from about 90 cm to about 250 cm, from about 95 cm to about 250 cm, from about 100 cm to about 250 cm, from about 110 cm to about 250 cm, from about 120 cm to about 250 cm, from about 130 cm to about 250 cm, from about 140 cm to about 250 cm, from about 150 cm to about 250 cm, from about 5 cm to about 240 cm, from about 5 cm to about 230 cm, from about 5 cm to about 220 cm, from about 5 cm to about 210 cm, from about 5 cm to about 200 cm, from about 5 cm to about 190 cm, from about 5 cm to about 180 cm, from about 5 cm to about 170 cm, from about 5 cm to about 160 cm, from about 5 cm to about 150 cm, from about 5 cm to about 140 cm, from about 5 cm to about 130 cm, from about 5 cm to about 120 cm, from about 5 cm to about 110 cm, from about 5 cm to about 110 cm, from about 5 cm to about 100 cm, from about 5 cm to about 90 cm, from about 5 cm to about 80 cm, or from about 5 cm to about 75 cm.

In one or more embodiments, the cover substrate includes a glass article or glass ceramic article that is strengthened. In one or more embodiments, the cover substrate has a compressive stress (CS) region that extends from one or both major surfaces 121, 122, to a first depth of compression (DOC). The CS region includes a maximum CS magnitude ($CS_{max}$). The cover substrate has a CT region disposed in the central region that extends from the DOC to an opposing CS region. The CT region defines a maximum CT magnitude ($CT_{max}$). The CS region and the CT region define a stress profile that extends along the thickness of the cover substrate.

In one or more embodiments, cover substrates that are glass articles or glass ceramic articles may be strengthened mechanically by utilizing a mismatch of the coefficient of thermal expansion between portions of the article to create a compressive stress region and a central region exhibiting a tensile stress. In some embodiments, the cover glass may be strengthened thermally by heating the glass to a temperature above the glass transition point and then rapidly quenching. In one or more embodiments, the glass article or glass ceramic article may be chemically strengthening by ion exchange. In the ion exchange process, ions at or near the surface of the glass article or glass ceramic article are replaced by—or exchanged with—larger ions having the same valence or oxidation state. In those embodiments in which the glass article or glass ceramic article comprises an alkali aluminosilicate glass, ions in the surface layer of the article and the larger ions are monovalent alkali metal cations, such as Li+, Na+, K+, Rb+, and Cs+. Alternatively, monovalent cations in the surface layer may be replaced with monovalent cations other than alkali metal cations, such as Ag+ or the like. In such embodiments, the monovalent ions (or cations) exchanged into the glass article or glass ceramic article generate a stress.

The cover substrate 104 can be secured to the frame 102 using an adhesive. The cover substrate 104 can be substantially flat or two-dimensional. The cover substrate 104 can be curved.

In one or more embodiments, the cover substrate is curved by cold-bending to the frame and secured in such a cold-bent state by the adhesive. As used herein, the terms "cold-bent," or "cold-bending" refers to curving the cover substrate at a cold-bend temperature which is less than the softening point of the glass. Often, the cold-bend temperature is room temperature. The term "cold-bendable" refers to the capability of a cover substrate to be cold-bent. In one or more embodiments the cold-bent cover substrate may comprise a glass article or glass ceramic article, which may optionally be strengthened. In more embodiments, a feature of a cold-bent cover substrate is asymmetric surface compressive stress between the first major surface and the second major surface. In one or more embodiments, prior to the cold-bending process or being cold-bent, the respective compressive stresses in the first major surface and the second major surface of the cover substrate are substantially equal. In one or more embodiments in which the cover substrate is unstrengthened, the first major surface and the second major surface exhibit no appreciable compressive stress (CS), prior to cold-bending. In one or more embodiments in which the cover substrate is strengthened (as described herein), the first major surface and the second major surface exhibit substantially equal compressive stress with respect to one another, prior to cold-bending. In one or more embodiments, after cold-bending, the CS on the surface having a concave shape after cold-bending increases, while the CS on the surface having a convex shape after cold-bending decreases. In other words, the CS on the concave surface is greater after cold-bending than before cold-bending. Without being bound by theory, the cold-bending process increases the CS of the cover substrate being shaped to compensate for tensile stresses imparted during cold-bending. In one or more embodiments, the cold-bending process causes the concave surface to experience compressive stresses, while the surface forming a convex shape after cold-bending experiences tensile stresses. The tensile stress experienced by the convex surface following cold-bending results in a net decrease in surface compressive stress, such that the compressive stress in convex surface of a strengthened cover substrate following cold-bending is less than the compressive stress on the same surface when the cover substrate is flat.

In one or more embodiments, the cover substrate 104 can be curved using a thermal process. In such embodiments, the cover substrate may be permanently curved and the first major surface and the second major surface have the same CS.

The display panel 106 can be a user interface such as a touch-sensitive liquid crystal display (LCD) panel. In some examples, the display panel 106 can include a controller or control board that can include machine readable medium. The term "machine readable medium" may include any medium that is capable of storing, encoding, or carrying instructions for execution by the device and that cause the device to perform any one or more of the techniques of the present disclosure, or that is capable of storing, encoding or carrying data structures used by or associated with such instructions. Non-limiting machine readable medium examples may include solid-state memories, and optical and magnetic media. Specific examples of machine readable media may include: non-volatile memory, such as semiconductor memory devices (e.g., Electrically Programmable Read-Only Memory (EPROM), Electrically Erasable Programmable Read-Only Memory (EEPROM)) and flash memory devices; magnetic disks, such as internal hard disks and removable disks; magneto-optical disks; and CD-ROM and DVD-ROM disks.

The display panel 106 can include a viewable side (front side) and a support side (back side) opposite the viewable side and can be disposed at least partially in the opening 114 of the frame 102. A periphery of the display panel 106 can be partially or substantially surrounded by the frame 102. A front side (or the viewable side) of the display panel 106 can be adjacent a back side of the cover substrate 104.

The housing 108 (or back cover) can be a rigid or semi-rigid member defining an opening therein, where the opening can be sized to receive and retain the display panel 106 therein. The housing 108 can enclose a back portion of the display panel 106 and can be secured to the back side or rear side of the frame 102 (as shown more clearly in FIG. 9).

In some examples, the housing 108 can be a single member, such as at least one of a stamped, formed, or broken member made of a thin-gauge metal. In other examples, the housing 108 can be made of multiple pieces such as using welding or fastening of multiple components. The housing 108 can be made of one or more materials such as one or more metals, plastics, foams, elastomers, ceramics, composites, one or more combinations thereof, or the like. In some examples, the housing 108 can be made of one or more of a stainless-steel alloy, titanium, aluminum, reinforced glass fiber, carbon fiber, or the like. The housing 108 can also include the frame 102. In this example, the frame members 102 can extend from a periphery of the housing 108.

The ribs 110A and 110B can be rigid or semi-rigid members secured to a back side of the frame 102. The ribs can be secured to substantially all of a perimeter of the back side of the frame 102. The ribs 110 can be strategically placed to reinforce the frame 102. The ribs 110 be secured behind a back of the housing 108 in addition to (or in lieu of) the ribs 110 on the frame 102.

In some examples, the ribs 110 can be made of one or more materials such as one or more metals, plastics, foams, elastomers, ceramics, composites, one or more combinations thereof, or the like. In some examples, the ribs 110 can be made of one or more of a stainless-steel alloy, titanium, aluminum, reinforced glass fiber, carbon fiber, or the like.

The brackets 112 can be attached to a back side of the housing 108 and can be further secured to a component of an automobile, such as a frame or support within, or of, a dashboard. In some examples, the brackets 112 can also be secured to the frame 102. In some examples, the brackets 112 can also include one or more bores therethrough such as for receiving corresponding fasteners for such mounting. The brackets 112 can be made of one or more materials such as one or more metals, plastics, foams, elastomers, ceramics, composites, one or more combinations thereof, or the like. In some examples, the brackets 112 can be made of one or more of a stainless-steel alloy, titanium, aluminum, reinforced glass fiber, carbon fiber, or the like.

The automotive display module 100 can be configured to transfer impact energy from the headform 102 to the brackets 112 via the cover substrate 104, the frame 102, the housing 108, and the ribs 110, such as to dissipate the impact energy and transfer the energy to the component of the automobile supporting the brackets 112.

For example, the headform 102 can contact the cover substrate 104 under HIT to simulate an accident involving a passenger hitting a display panel. Such contact between the headform 102 and the cover substrate 104 can deliver approximately 152 Joules to the cover substrate 104. Forces generated from the impact can be transferred from the cover substrate 104 to the frame 102. The frame 102 can dissipate forces itself and can be sufficiently rigid (through the help of the ribs 110) to transfer forces to the housing 108. In some examples, the fasteners securing the housing 108 to the frame 102 and the housing 108 to the brackets can undergo plastic deformation to dissipate energy (forces and stresses). In either scenario, a portion of the forces can be transferred from the housing 108 to the brackets 112 and to the component of the automobile supporting the automotive display module 100.

In some examples, materials of the frame 102, ribs 110, housing 108, and brackets 112 can be selected to improve dissipation of the impact energy. Materials for each component can be selected based upon one or more properties such as modulus of elasticity, ductility, fracture toughness, and yield strength. Materials with a relatively high modulus of elasticity and a relatively high ductility can help to maintain a desired shape of the frame 102, ribs 110, housing 108, and brackets 112, while also helping to absorb a greater amount of energy without fracturing. Materials with such properties can also provide an advantage of easier formability in manufacturing processes such as stamping, as discussed below with respect to FIGS. 10A-10D.

By including the frame 102, ribs 110, housing 108, and brackets 112, as described above, the automotive display module 100 can provide enough stiffness to handle normal use and can be configured to absorb energy during head impact and to help reduce stress in the cover substrate 104 during impact. Such a reduction of stress in the cover substrate can help keep the cover substrate 104 intact after impact to help reduce a possibility of laceration during an accident.

Also, because the techniques discussed herein do not require a change to the display panel 106, the automotive display module 100 can be relatively cost effective. Further, because the components of the automotive display module 100 can be assembled using assembling methods commonly used for automotive components, installation of the automotive display module 100 can be relatively easy and cost effective.

FIG. 2A illustrates a graph showing impact performance of two automotive display modules, in accordance with at least one example of this disclosure. FIG. 2B illustrates a graph showing impact performance of two automotive display modules, in accordance with at least one example of this disclosure. FIGS. 2A and 2B are discussed below concurrently.

FIG. 2A shows a graph including Time in seconds(s) on the x-axis and acceleration in gravitational force unites (G) on the y-axis. A plot 202 represents performance of an approach using an aluminum frame having a thickness of about 3 millimeters. In this approach, the maximum acceleration can be under 40 G, which is well under the required maximum of 80 G of FMVSS 201. A plot 204 represents performance of a approach using a stainless-steel frame having a thickness of about 3 millimeters. In this approach, the maximum acceleration can be just over 40 G, which is also well under the required maximum of 80 G of FMVSS 201.

FIG. 2B shows a graph including Time in seconds(s) on the x-axis and stress in giga Pascals (GPa) on the y-axis. A plot 206 represents performance of the approach using the aluminum frame of FIG. 2A. In this approach, the maximum stress can just above 1.2 GPa. A plot 208 represents performance of a approach using the stainless-steel frame of FIG. 2A. In this approach, the maximum stress can be about 1.15 GPa, and the stress on the cover substrate of the plot 208 can be significantly lower than that of the plot 206 between 0 seconds and about 0.02 seconds. Such a reduced stress of the stainless steel 3-millimeter frame can help reduce a probability of the cover substrate breaking during impact while still maintaining an acceleration well below 80 G.

The values indicate that in this case, either frame will pass HIT criterion because the 3-millisecond acceleration is below 80 G. However, in the case of the Aluminum frame, shown by plots 202 and 206, the peak stress values exceed the failure limit of the cover substrate, such that the probability of breakage is very high, whereas the peak stress values of the stainless-steel frame shown by plot 204 are below the failure limit. Therefore, by changing the material from Aluminum to Steel, the stiffness of the display is increased to reduce stress in cover substrate due to local bending upon headform impact, which can help reduce failure of the cover substrate.

Figure 3A:
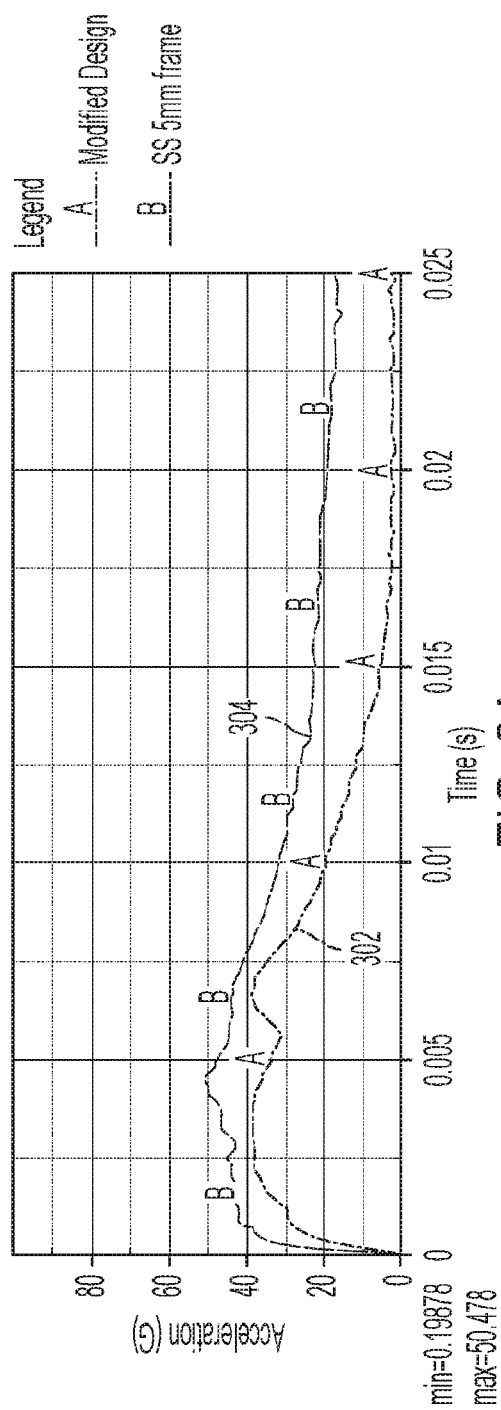
FIG. 3A illustrates a graph showing impact performance of two automotive display modules, in accordance with at least one example of this disclosure.
Figure 3B:
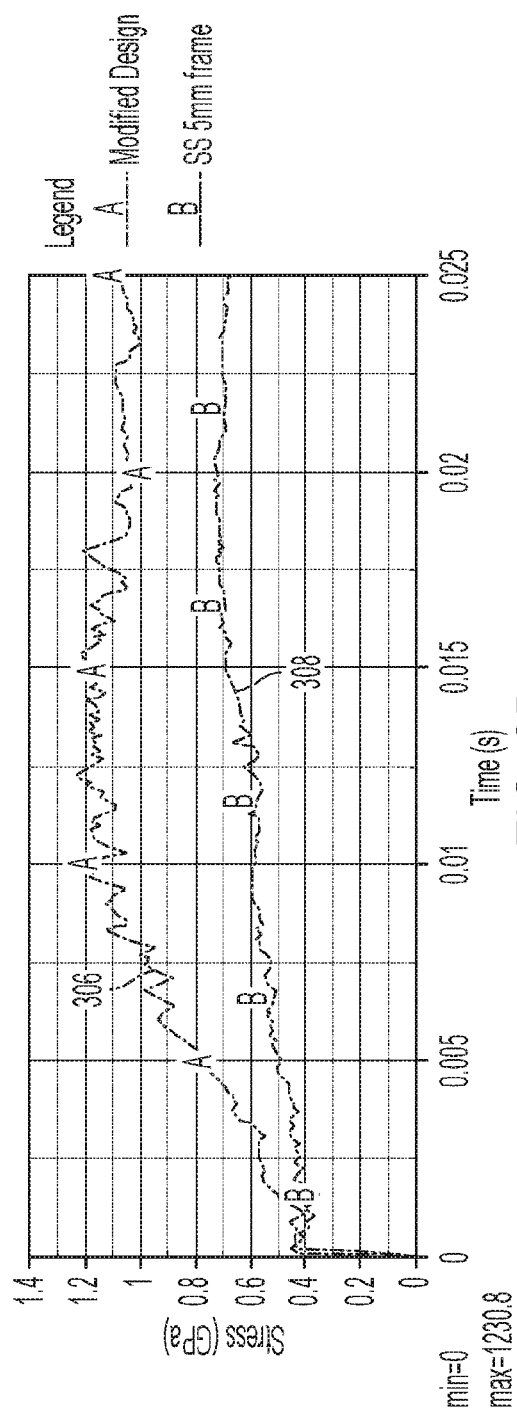
FIG. 3B illustrates a graph showing impact performance of two automotive display modules, in accordance with at least one example of this disclosure.

FIG. 3A illustrates a graph showing impact performance of two automotive display modules, in accordance with at least one example of this disclosure. FIG. 3B illustrates a graph showing impact performance of two automotive display modules, in accordance with at least one example of this disclosure. FIGS. 3A and 3B are discussed below concurrently.

FIG. 3A shows a graph including Time in seconds(s) on the x-axis and acceleration in gravitational force unites (G) on the y-axis. A plot 302 represents performance of an approach using an aluminum frame having a thickness of about 3 millimeters. In this approach, the maximum acceleration can be under 40 G, which is well under the required maximum of 80 G of FMVSS 201. A plot 304 represents performance of an approach using a stainless-steel frame having a thickness of about 5 millimeters. In this approach, the maximum acceleration can be about 50 G, which is also well under the required maximum of 80 G of FMVSS 201.

FIG. 3B shows a graph including Time in seconds(s) on the x-axis and stress in GPa on the y-axis. A plot 306 represents performance of the approach using the aluminum frame of FIG. 3A. In this approach, the maximum stress can just above 1.2 GPa. A plot 308 represents performance of a approach using the stainless-steel frame of FIG. 3A. In this approach, the maximum stress can be about 0.7 GPa, and the stress on the cover substrate of the plot 308 can be significantly lower throughout the duration of the plot. Such a reduced stress of the stainless steel 5-millimeter frame can help reduce breaking during impact while still maintaining an acceleration well below 80 G.

FIG. 4A illustrates a graph showing impact performance of two automotive display modules, in accordance with at least one example of this disclosure. FIG. 4B illustrates a graph showing impact performance of two automotive display modules, in accordance with at least one example of this disclosure. FIGS. 4A and 4B are discussed below concurrently.

FIG. 4A shows a graph including Time in seconds(s) on the x-axis and acceleration in gravitational force unites (G) on the y-axis. A plot 402 represents performance of an approach using a 3-millimeter aluminum frame including reinforcement ribs. In this approach, the maximum acceleration is approximately 80 G, which is at the required maximum of 80 G of FMVSS 201. A plot 404 represents performance of an approach using a stainless-steel frame having a thickness of about 5 millimeters, as shown in FIG. 3A above.

FIG. 4B shows a graph including Time in seconds(s) on the x-axis and stress in mega Pascals (MPa) on the y-axis. A plot 406 represents performance of the approach using the ribs of FIG. 4A. In this approach, the maximum stress can be just above 700 MPa. A plot 408 represents performance of the approach using the stainless-steel frame of FIGS. 3A-4A. In this approach, the maximum stress can be about 750 MPa.

The plots of FIGS. 4A-4B show that acceleration for the aluminum frame and rib approach (plots 402 and 406) can have an increased acceleration that reaches the limit of 80 G; however, such an acceleration passes FMVSS 201. FIG. 4B also shows that for both approaches, the peak stress remains below a threshold value for breakage. A major advantage of the aluminum rib frame is that the peak stress of the cover substrate is reduce with a frame having a much lower weight than that of the stainless-steel frames.

Figure 5C:
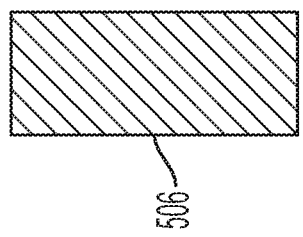
FIG. 5C illustrates a cross-section side view of a frame member automotive display module, in accordance with at least one example of this disclosure.
Figure 5F:
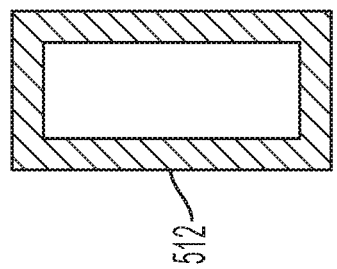
FIG. 5F illustrates a cross-section side view of a frame member automotive display module, in accordance with at least one example of this disclosure.
Figure 5B:
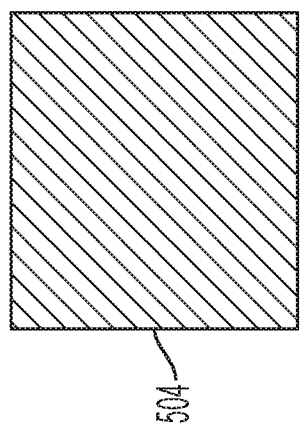
FIG. 5B illustrates a cross-section side view of a frame member automotive display module, in accordance with at least one example of this disclosure.
Figure 5E:
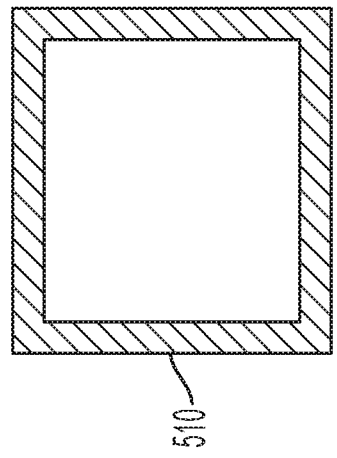
FIG. 5E illustrates a cross-section side view of a frame member automotive display module, in accordance with at least one example of this disclosure.
Figure 5A:
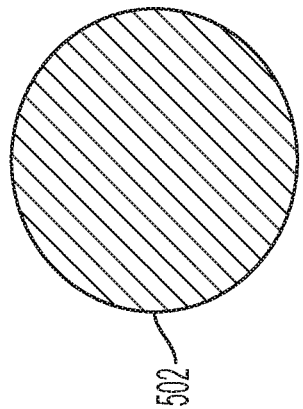
FIG. 5A illustrates a cross-section side view of a frame member automotive display module, in accordance with at least one example of this disclosure.

FIG. 5A illustrates a cross-section side view of a frame member 502 of an automotive display module, in accordance with at least one example of this disclosure. The frame member 502 can be a solid rod, such as a cylindrical rod.

FIG. 5B illustrates a cross-section side view of a frame member 504 of an automotive display module, in accordance with at least one example of this disclosure. The frame member 504 can be a solid square bar.

FIG. 5C illustrates a cross-section side view of a frame member 506 of an automotive display module, in accordance with at least one example of this disclosure. The frame member 506 can be a solid rectangular bar.

Figure 5D:
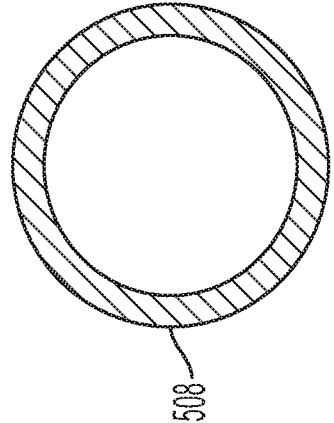
FIG. 5D illustrates a cross-section side view of a frame member automotive display module, in accordance with at least one example of this disclosure.

FIG. 5D illustrates a cross-section side view of a frame member 508 of an automotive display module, in accordance with at least one example of this disclosure. The frame member 508 can be a cylindrical tube (or an annulus).

FIG. 5E illustrates a cross-section side view of a frame member 510 of an automotive display module, in accordance with at least one example of this disclosure. The frame member 510 can be a square tube (or a square annulus)

FIG. 5F illustrates a cross-section side view of a frame member 512 of an automotive display module, in accordance with at least one example of this disclosure. The frame member 512 can be a rectangular tube (or a rectangular annulus).

That is, the frame member can have a cross-sectional area having a geometric shape of one of a circle, a rectangle, a square, an annulus, a square tube, a rectangular tube, or the like. Similarly, the ribs discussed above with respect to FIG. 1 (such as ribs 110) can have cross sections shown in FIGS. 5A-5E to help reinforce the frame members 102 or 502-512.

Each of the frame members 502-512 can have a varying thickness such as to optimize reduction stress of the cover substrate during impact and reduction of experienced acceleration of the headform caused by impact with the cover substrate. In some examples, thicknesses of the solid frame members (502-506) can be about 0.5 millimeter to about 8 millimeters. In further examples, the thickness can be about 3 millimeters to about 5 millimeters. Such thicknesses can provide a frame sufficient to reduce stress in the cover substrate while helping to limit acceleration of the headform. The hollow frame members (508-512) can have similar ranges of overall thicknesses, in some examples, but can have a lower weight and lower strength due to being hollow. In some examples, the thickness of the hollow frame members (508-512) can be larger, such as between 0.5 millimeters and 12 millimeters to provide an increased strength.

In some examples, any of the frame members 502-512 can achieved desired performance during a HIT when the mass of the frame members is distributed appropriately through the frame member. For example, to achieve desired HIT performance, frame members 502-512 can each have a second moment of area, or moment of inertia of plane area, between about 18 millimeters quartic ($mm^4$) to about 200 millimeters quartic ($mm^4$). In some examples, frame members 502-512 can each have a second moment of area from about 19.4 $mm^4$ to about 197.6 $mm^4$. In further examples, the frame members 502-512 can each have a second moment of area, or moment of inertia of plane area, between about 0.5 millimeters quartic ($mm^4$) to about 300 millimeters quartic ($mm^4$).

Figure 6:
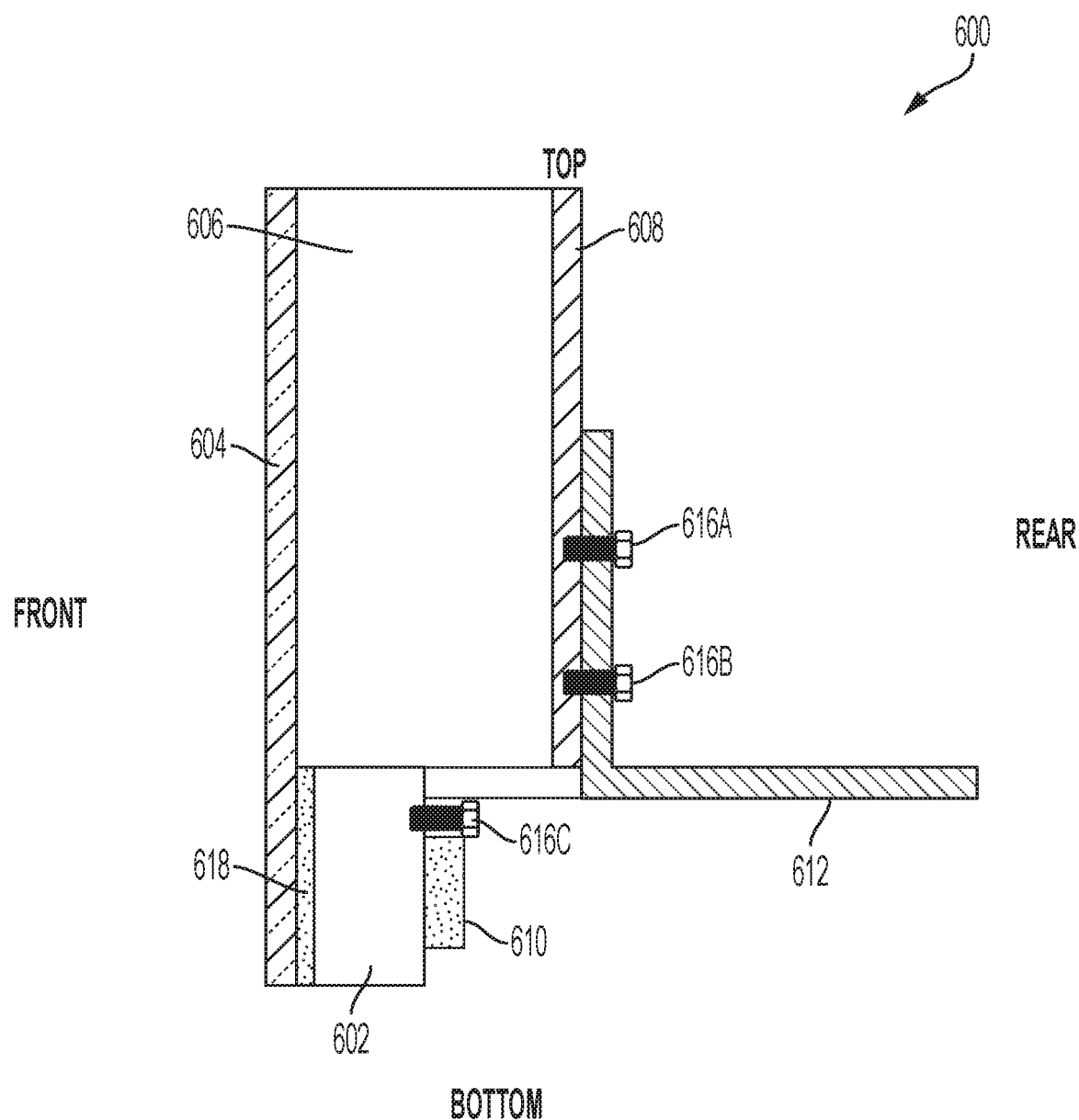
FIG. 6 illustrates a cross-section side view of a portion of an automotive display module, in accordance with at least one example of this disclosure.

FIG. 6 illustrates a cross-section side view of a portion of an automotive display module 600, in accordance with at least one example of this disclosure. The display module 600 can be consistent with the display module 100 discussed above with respect to FIG. 1, except display module 600 includes fasteners 616A-616C.

The fasteners 616A-616C can be screws, bolts, rivets, or the like, configured to secure together components of the display module 600. For example, the fasteners 616A and 616B can secure the mounting bracket 612 to the housing 608. Also, the fastener 616C can secure the housing 608 to the frame 602. By securing the frame 602 to the housing 608 and the bracket 612, the fasteners 616A-616C can help transfer forces from the cover substrate 604 to the bracket 612 and therefore to the component of the automobile supporting the display module 600.

In some examples, the fasteners 616A-616C can be made of a material configured to reduce forces transferred from the bracket to the housing by deforming to dissipate energy created by the impact to the cover substrate. For example, the fasteners 616A-616C can be made of plastics, such as one or more of nylon, acrylonitrile butadiene styrene (ABS), glass fiber reinforced plastics, or the like. Fasteners 616A-616C can be comprised of other materials that may shear, break, plasticly deform, or stretch at a desired stress level to dissipate energy. Such fasteners can be made of materials having a low yield strength and/or high ductility, such as one or more of aluminum, copper, magnesium, mild steels, their alloys, or the like.

In some examples, fasteners 616A-616C can have a small diameter to allow the fasteners 616A-616C to break at a desired stress level. A small number of small diameter fasteners 616A-616C can also be used control energy dissipation.

FIG. 6 also shows adhesive 618 which can be used to secure the cover substrate 604 to the frame 602. In some examples, the adhesive 618 can secure the cover substrate 604 to the frame 602 during a cold-forming process. The adhesive 618 can be one or more of an epoxy resin, a pressure sensitive adhesive, a light cured adhesive, or the like.

Figure 7A:
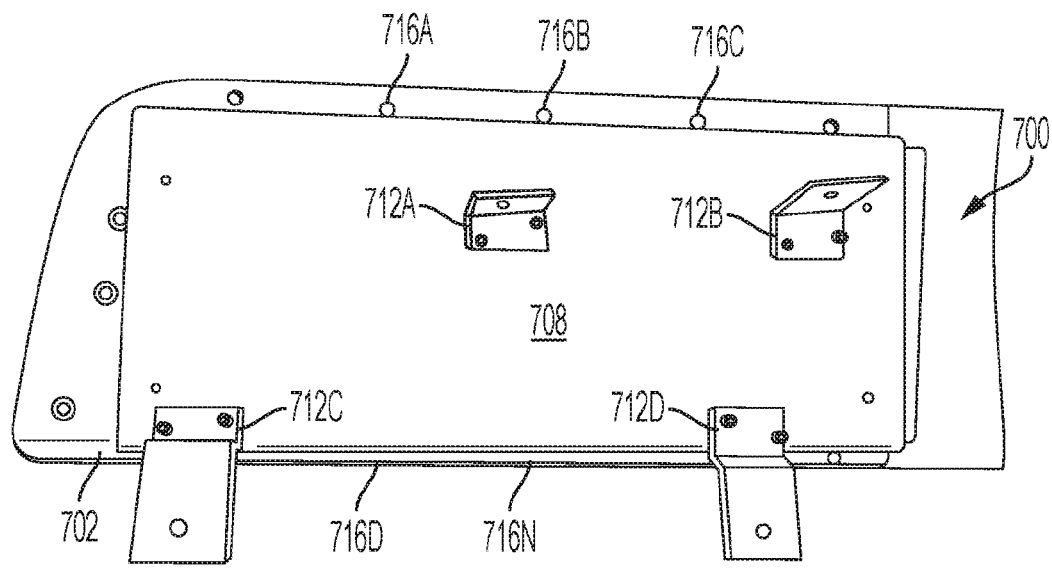
FIG. 7A illustrates a rear view of an automotive display module, in accordance with at least one example of this disclosure.
Figure 7B:
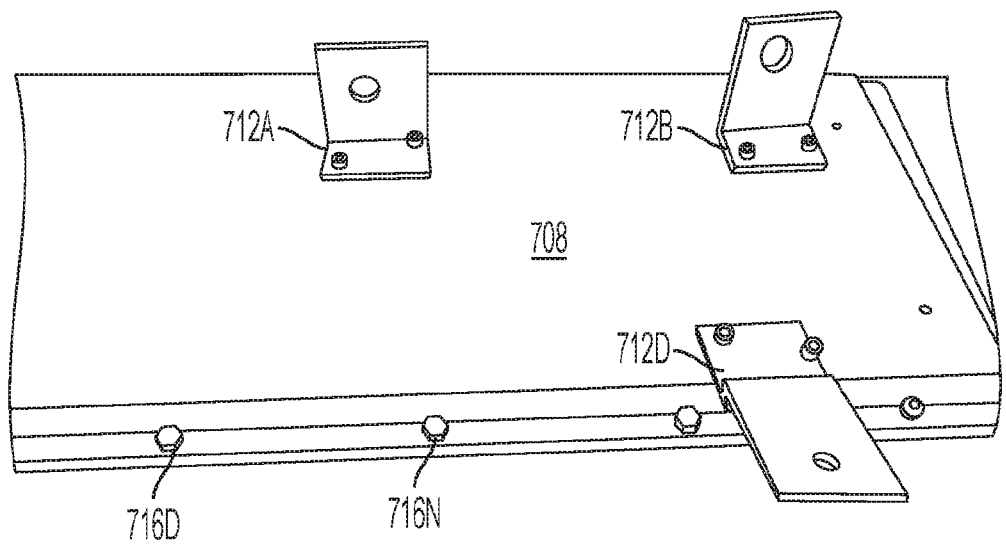
FIG. 7B illustrates a bottom-rear view of an automotive display module, in accordance with at least one example of this disclosure.
Figure 7C:
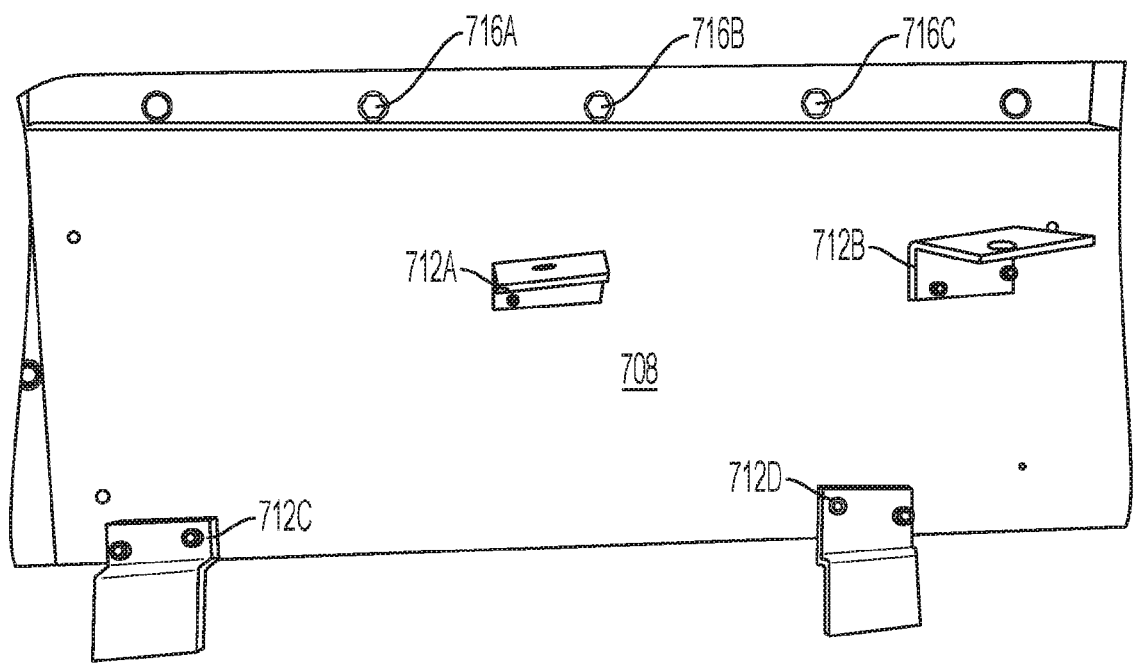
FIG. 7C illustrates a bottom-rear view of an automotive display module, in accordance with at least one example of this disclosure.

FIG. 7A illustrates a rear view of an automotive display module 700, in accordance with at least one example of this disclosure. FIG. 7B illustrates a bottom-rear view of the automotive display module 700, in accordance with at least one example of this disclosure. FIG. 7C illustrates a bottom-rear view of the automotive display module 700, in accordance with at least one example of this disclosure. FIGS. 7A-7C are discussed below concurrently.

FIGS. 7A-7C show the automotive display module 700, which can be consistent with the display module 600 discussed above with respect to FIG. 6. The display module 700 further shows how fasteners 716A-716N can secure the housing 708 to the frame 702 to create a relatively weak connection between the housing 708 and the frame 702.

In operation of some examples, during a HIT, energy from the impact can be dissipated by deformation of the fasteners 716A-716N, such as shear and delamination of the fasteners 716A-716N. As the 716A-716N, such as nylon screws, are broken first, reduced forces can be transmitted from the frame 702 to the housing 708.

Figure 8A:
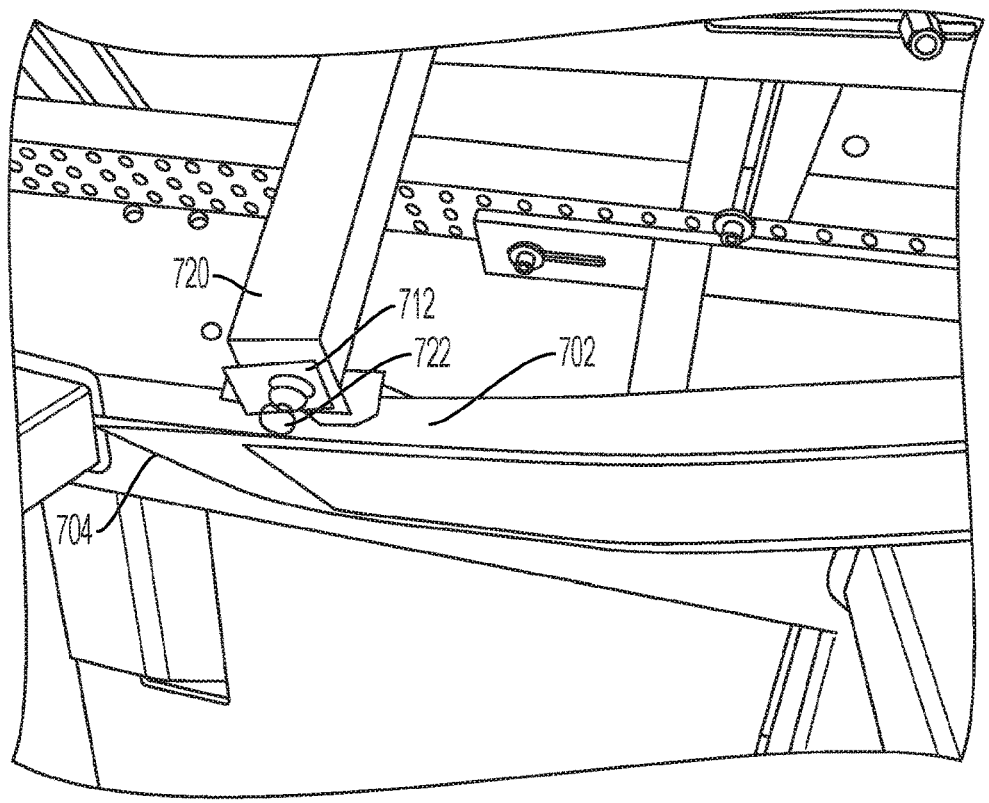
FIG. 8A illustrates a top-front view of an automotive display module, in accordance with at least one example of this disclosure.
Figure 8B:
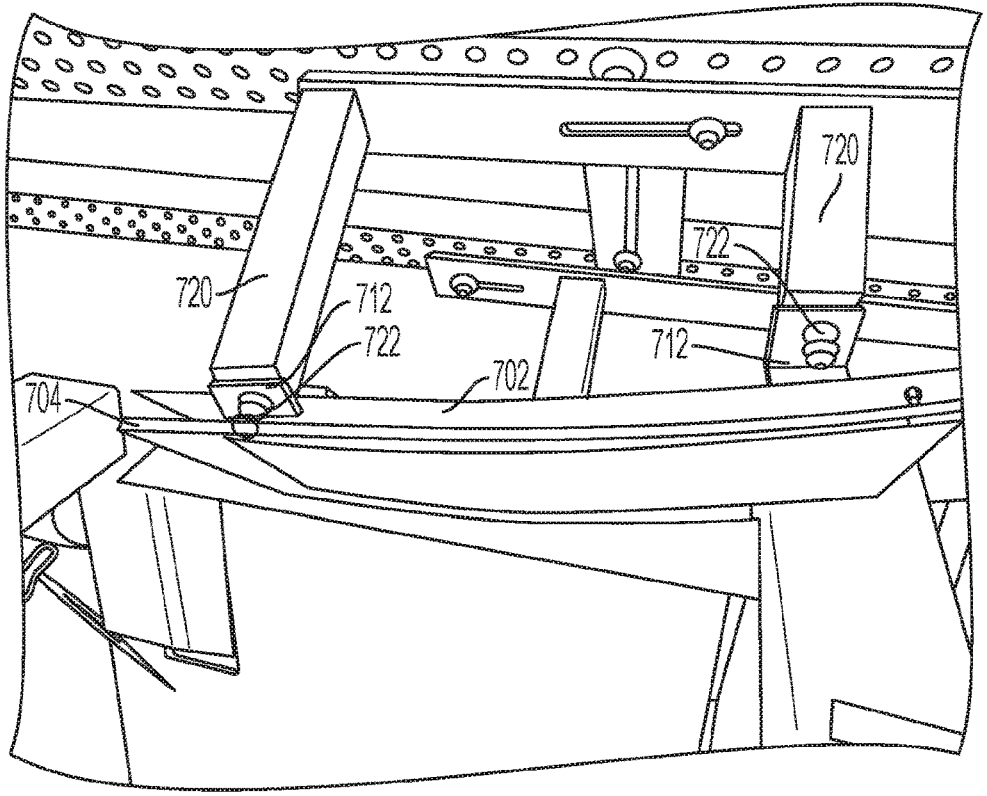
FIG. 8B illustrates a top-front view of an automotive display module, in accordance with at least one example of this disclosure.

FIG. 8A illustrates a top-front view of an automotive display module, in accordance with at least one example of this disclosure. FIG. 8B illustrates a top-front view of an automotive display module, in accordance with at least one example of this disclosure. FIGS. 8A-8B are discussed below concurrently.

FIGS. 8A-8B show the automotive display module 700, which can be consistent with the display module 700 discussed above with respect to FIGS. 6-7C; FIGS. 8A-8B show how fasteners 722 can secure the brackets 712 to a component 720 to secure the display module 700 to the component, where the component can be, for example, a component of an automobile or a component of a test assembly. The fasteners 722 can be screws, bolts, rivets, or the like. In some examples, the fasteners 722 can be metal screws or bolts to help ensure forces of the impact are transferred from the brackets 712 to the components 720.

Figure 9:
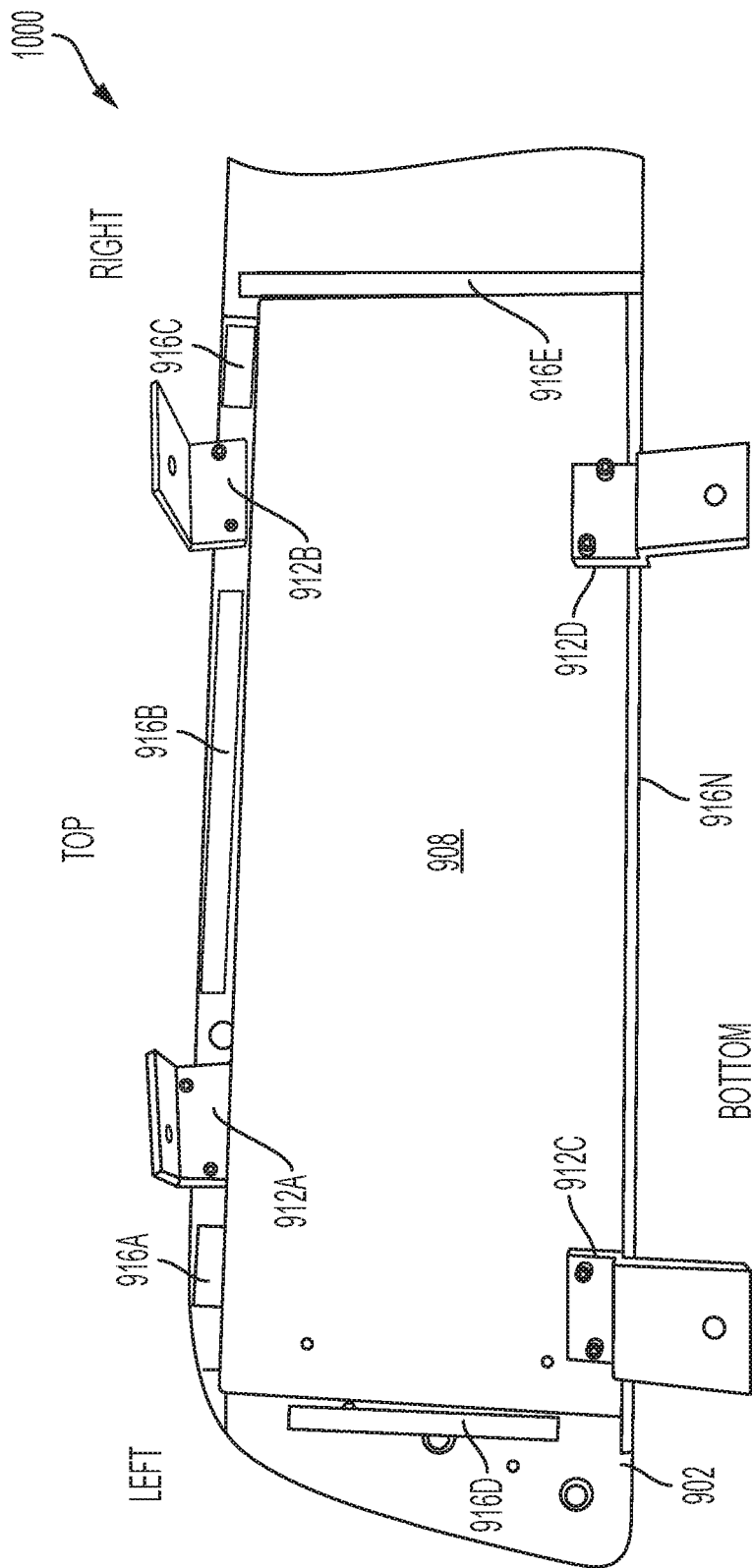
FIG. 9 illustrates a rear view of an automotive display module, in accordance with at least one example of this disclosure.

FIG. 9 illustrates a rear view of an automotive display module 900, in accordance with at least one example of this disclosure. The display module 900 can be consistent with the display modules discussed above, except the display module 900 shows how ribs 916A-916N can be disposed around a periphery of the housing 908 and can be attached to the frame 902.

In some examples, the display module 900 can include several ribs spanning a section. For example, ribs 916A-916C can be individual ribs surrounding the brackets 912A and 912B. Similarly, rib 916D can span only a portion of the left side of the frame 902, while the rib 916E can span substantially all of a length of a right side of the frame 902. The rib 916N can similarly span substantially all of a length of a bottom side of the frame 902. The rib 916N can also pass between the brackets 912C and 912D and the frame 902. Intermediate placing of ribs, such as the ribs 916A-916D can help to reinforce the frame 902 and can help to further minimize weight of the display module 900. Though FIG. 9 shows six of ribs 916A-916N, fewer ribs, such as 1, 2, 3, 4, or 5, or more ribs, such as 7, 8, 9, 10, 12, 15, 20, or the like can be used.

FIG. 9 also shows that brackets 912A and 912B can be secured to the frame 902 outward from the display panel portion to help more directly transfer forces from the frame 902 to the brackets 912A and 912B.

Figure 10A:
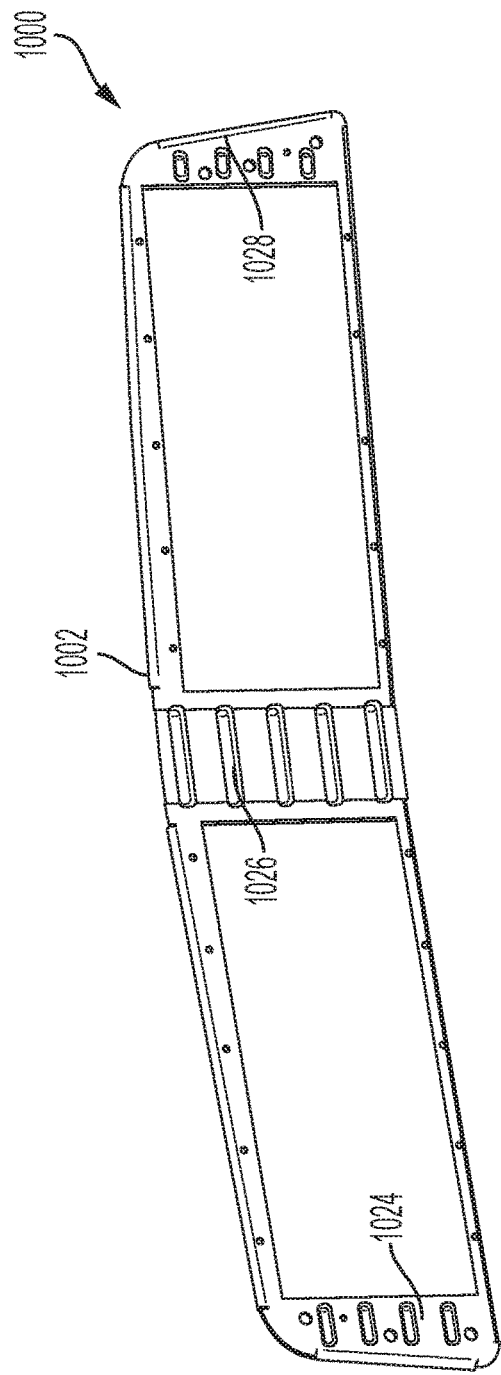
FIG. 10A illustrates a front-front view of an automotive display module frame, in accordance with at least one example of this disclosure.
Figure 10B:
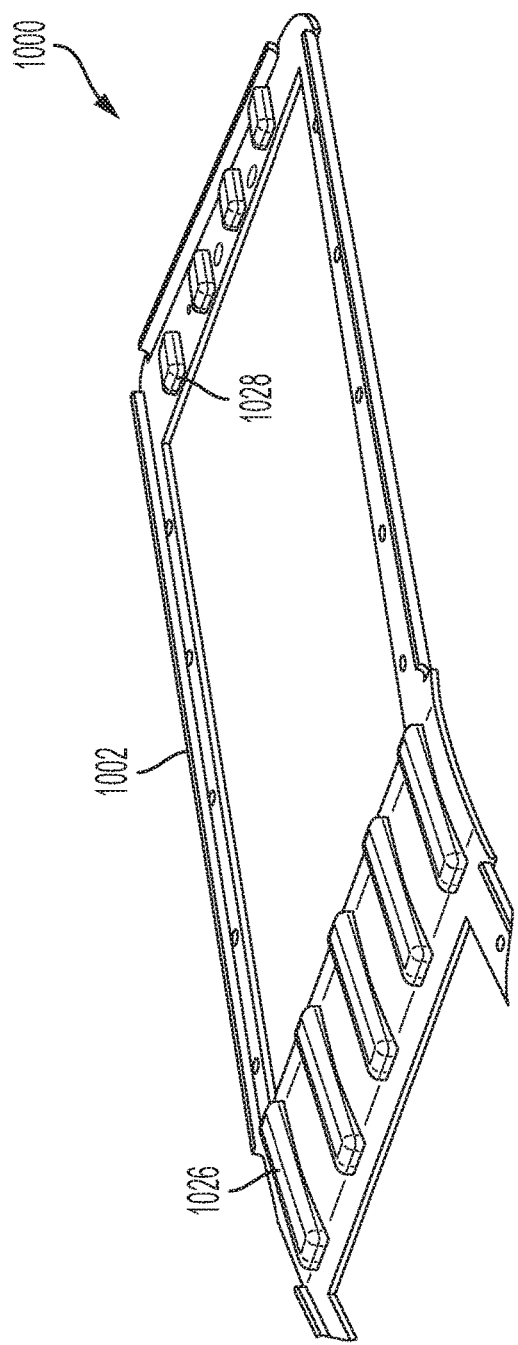
FIG. 10B illustrates a rear-front view of an automotive display module frame, in accordance with at least one example of this disclosure.
Figure 10C:
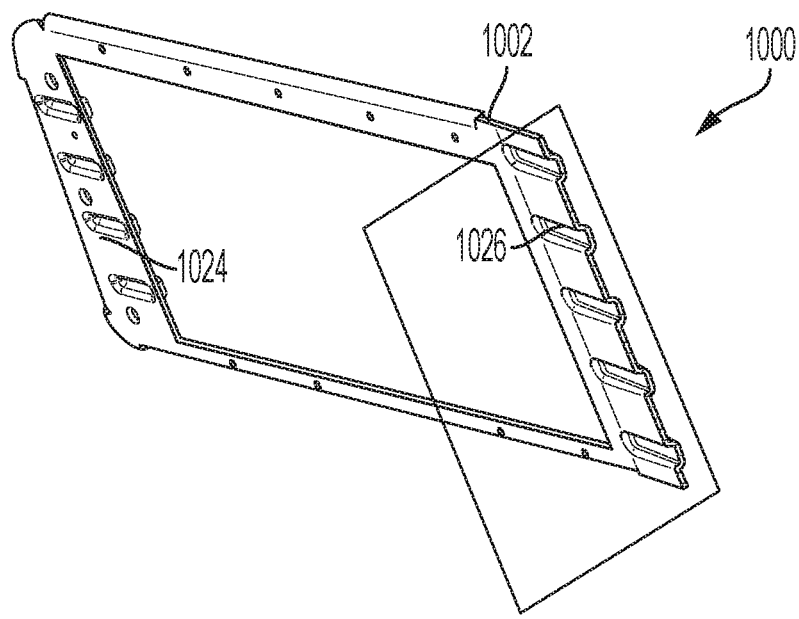
FIG. 10C illustrates an isometric cross-section view of an automotive display module frame, in accordance with at least one example of this disclosure.
Figure 10D:
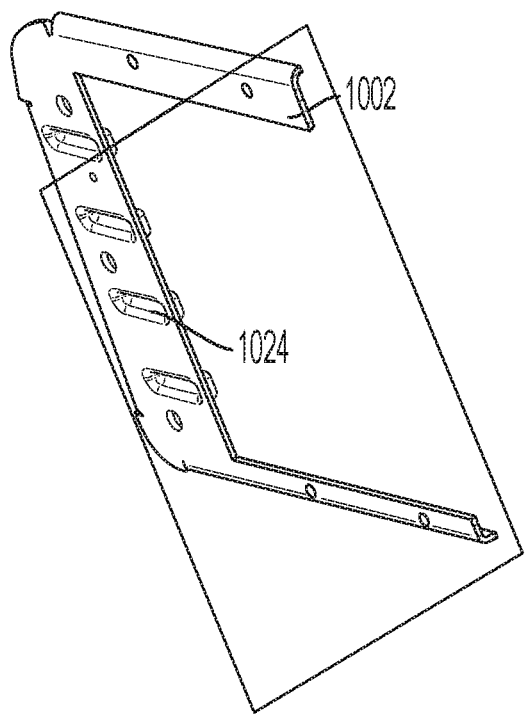
FIG. 10D illustrates an isometric cross-section view of an automotive display module frame, in accordance with at least one example of this disclosure.

FIG. 10A illustrates a front-front view of an automotive display module frame 1002, in accordance with at least one example of this disclosure. FIG. 10B illustrates a rear-front view of the automotive display module frame 1002, in accordance with at least one example of this disclosure. FIG. 10C illustrates an isometric cross-section view of an automotive display module frame 1002, in accordance with at least one example of this disclosure. FIG. 10D illustrates an isometric cross-section view of an automotive display module frame 1002, in accordance with at least one example of this disclosure.

The frame 1002 shown in FIGS. 10A-10D can be similar to the frames of the automotive display modules discussed above, except that the frame 1002 can include stamps 1024, 1026, and 1028. The stamps 1024, 1026, and 1028 can help to reinforce or stiffen the frame 1002 to provide improved strength and rigidity to the frame 1002. Such improved material characteristics can help reduce acceleration of a headform during HIT and can help reduce stress of a cover substrate during HIT. In other examples, other structural changes can be made to the frame 1002 to improve its strength and rigidity, such as folds or bends of the frame 1002.

In some examples, secondary structures of the display module, such as brackets (similar to brackets 712 discussed above) can include stamps, folds, and/or bends to improve rigidity and impact absorption of the display module. By placing structures into the brackets, the overall stiffness of the display module can be enhanced in specific areas with minimal impact on the module weight.

Figure 11:
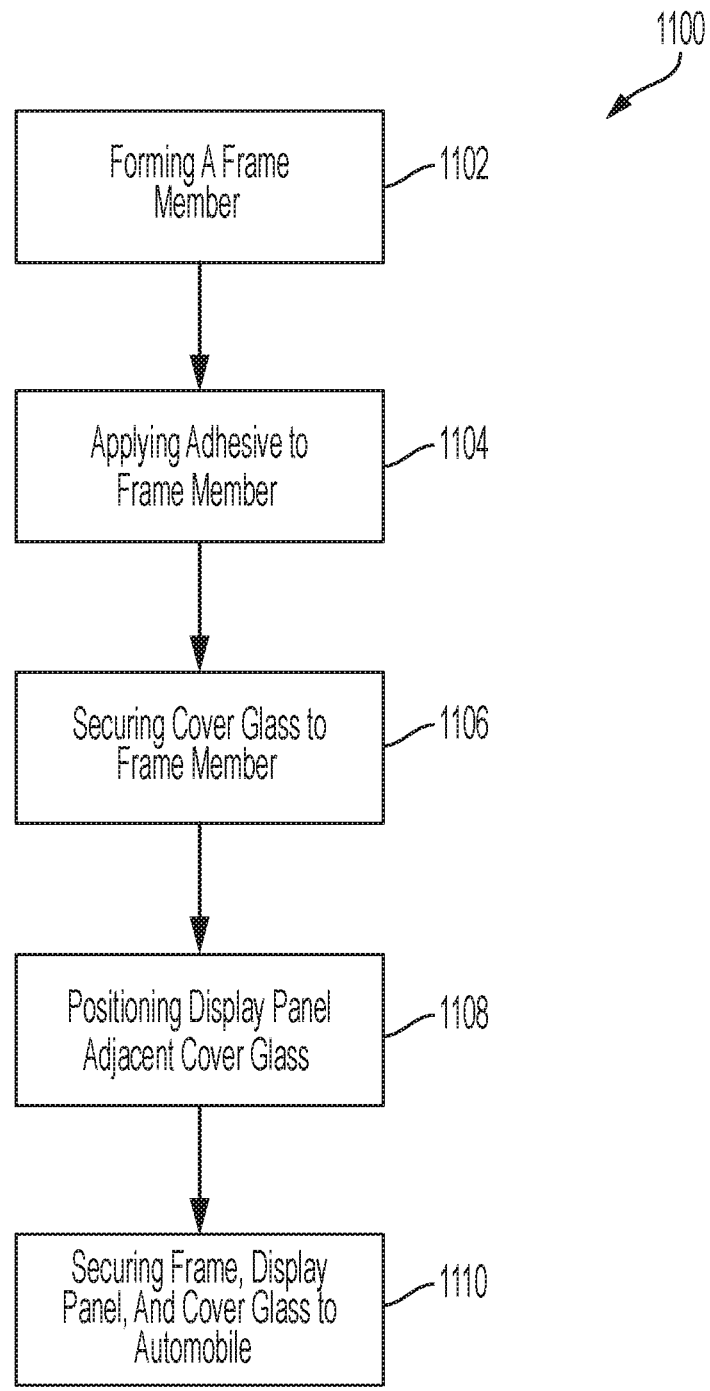
FIG. 11 illustrates a method of manufacturing an automotive display module, in accordance with at least one example of this disclosure.

FIG. 11 illustrates a method 1100 of manufacturing an automotive display module, in accordance with at least one example of this disclosure. The steps or operations of the method 1100 are illustrated in a particular order for convenience and clarity; many of the discussed operations can be performed in a different sequence or in parallel without materially impacting other operations. The method 1100 as discussed can include operations performed by multiple different actors, devices, and/or systems. It is understood that subsets of the operations discussed in the method 1100 attributable to a single actor, device, or system could be considered a separate standalone process or method.

In some examples, the method 1100 can begin at step 1102, where a frame member can be formed. For example, the frame member 110A of the automotive display module 100 of FIG. 1 can be formed. At step 1104 an adhesive can be applied to a front side of the frame member. For example, the adhesive 618 of the automotive display module 600 of FIG. 6 can be applied to a front side of the frame member 602. At step 1106, a cover substrate can be secured to the front side of the frame member using the adhesive. For example, the cover substrate 604 of FIG. 6 can be secured to the front side of the frame member 602 using the adhesive 618.

At step 1108, a display panel can be positioned to a back side of the cover substrate. For example, the display panel 606 can be positioned to a back side of the cover substrate 604 of FIG. 6. At step 1110, the frame, the display panel, and the cover substrate can be secured to a component of an automobile. For example, the frame 102, the display panel 106, and the cover substrate 104 can be secured to the component 720 of an automobile.

In another example, the method 1100 can include a step of securing a housing to a back side of the frame and to a back side of the display panel to at least partially enclose the display panel. In another example, the method 1100 can include a step of securing a mounting bracket to the housing. In another example, securing the frame, the display panel, and the cover substrate to the component of the automobile can include securing the mounting bracket to the component of the automobile.

In another example, securing the housing to the back side of the frame can include securing a first plastic fastener to the frame and the housing, where securing the mounting bracket to the housing can include securing a second plastic fastener to the mounting bracket and the housing, and where the first plastic fastener and the second plastic fastener can be configured to reduce forces transferred from the bracket to the housing by deforming to dissipate energy created by the impact to the cover substrate.

In another example, cold-forming the cover substrate can include applying a force to a front side of the cover substrate to form the glass to a three-dimensional shape of the frame member. In another example, the method 1100 can include a step of cold-forming the cover substrate to the front side of the frame member. In another example, the method 1100 can include a step of securing a rib to a back side of the frame member that is opposite the front side of the frame member, the rib configured to reinforce the frame member during a front-side impact. In another example, the frame member can have a front-to-back thickness between about 0.5 millimeters and about 7.5 millimeters.

The following, non-limiting examples, detail certain aspects of the present subject matter to solve the challenges and provide the benefits discussed herein, among others.

Example 1 is an automotive display module can include: a mounting bracket that can be securable to a component of an automobile; a display panel that can include a front side and an opposite back side, the display panel can be coupled to the mounting bracket; a cover substrate can include a front side and a back side, the back side adjacent to the front side of the display panel; and a frame member that can be connected to the back side of the cover substrate, the frame member can be located about a periphery of the display panel.

In Example 2, the subject matter of Example 1 optionally includes wherein the cover substrate is adhered to the frame from forming the cover substrate.

In Example 3, the subject matter of any one or more of Examples 1-2 optionally include wherein the cover substrate includes a three-dimensional cold-formed glass.

In Example 4, the subject matter of any one or more of Examples 1-3 optionally include a rib that can be securable to a backside of the frame member to reinforce the frame member.

In Example 5, the subject matter of any one or more of Examples 1-4 optionally include a housing that can least partially surrounding the front side and the periphery of the display panel, the housing can be coupled to the frame member.

In Example 6, the subject matter of Example 5 optionally includes a first fastener that can secure the frame member to the housing, the first fastener can be configured to reduce forces transferred from the frame member to the housing by deforming to dissipate energy created by an impact to the cover substrate.

In Example 7, the subject matter of Example 6 optionally includes a second fastener securing the bracket to the housing, the second fastener can be configured to reduce forces transferred from the bracket to the housing by deforming to dissipate energy created by the impact to the cover substrate.

In Example 8, the subject matter of any one or more of Examples 5-7 optionally include wherein the first fastener and the second fastener are made of plastic.

In Example 9, the subject matter of any one or more of Examples 1-8 optionally include wherein the frame member is made of one of a stainless-steel alloy, titanium, aluminum, reinforced glass fiber, carbon fiber, a ferritic stainless-steel, an austenitic stainless-steel, a duplex stainless-steel, a carbon steel, a galvanized carbon steel, an aluminum alloy, or a magnesium alloy.

In Example 10, the subject matter of any one or more of Examples 1-9 optionally include wherein the frame member has a front-to-back thickness between 0.5 millimeters and 7.5 millimeters.

In Example 11, the subject matter of any one or more of Examples 1-10 optionally include wherein the frame member has a cross-sectional area having a geometric shape of one of a circle, a rectangle, a square, an annulus, a square tube, and a rectangular tube.

In Example 12, the subject matter of any one or more of Examples 1-11 optionally include wherein a second moment of area of the frame member is between about 18 millimeters quartic to about 200 millimeters quartic.

In Example 13, the subject matter of any one or more of Examples 1-12 optionally include wherein the bracket is coupled to the frame member.

In Example 14, the subject matter of any one or more of Examples 1-13 optionally include wherein the frame member includes stamping to reinforce the frame member.

Example 15 is a method of manufacturing an automotive display module, the method comprising: forming a frame member; applying an adhesive to a front side of the frame member; securing a cover substrate to the front side of the frame member using the adhesive; positioning a display panel adjacent to a back side of the cover substrate; and securing the frame, the display panel, and the cover substrate to a component of an automobile.

In Example 16, the subject matter of Example 15 optionally includes securing a housing to a back side of the frame and to a back side of the display panel to at least partially enclose the display panel.

In Example 17, the subject matter of Example 16 optionally includes securing a mounting bracket to the housing.

In Example 18, the subject matter of Example 17 optionally includes wherein securing the frame, the display panel, and the cover substrate to the component of the automobile includes securing the mounting bracket to the component of the automobile.

In Example 19, the subject matter of Example 18 optionally includes wherein securing the housing to the back side of the frame includes securing a first plastic fastener to the frame and the housing, wherein securing the mounting bracket to the housing includes securing a second plastic fastener to the mounting bracket and the housing, and wherein the first plastic fastener and the second plastic fastener are configured to reduce forces transferred from the bracket to the housing by deforming to dissipate energy created by the impact to the cover substrate.

In Example 20, the subject matter of any one or more of Examples 15-19 optionally include cold-forming the cover substrate to the front side of the frame member.

In Example 21, the subject matter of Example 20 optionally includes wherein cold-forming the cover substrate includes applying a force to a front side of the cover substrate to form the glass to a three-dimensional shape of the frame member.

In Example 22, the subject matter of any one or more of Examples 15-21 optionally include securing a rib to a back side of the frame member that is opposite the front side of the frame member, the rib configured to reinforce the frame member during a front-side impact.

In Example 23, the subject matter of any one or more of Examples 16-22 optionally include wherein the frame member has a front-to-back thickness between about 0.5 millimeters and about 7.5 millimeters.

Example 24 is an automotive display module comprising: a mounting bracket securable to a component of an automobile; a display panel including a front side and an opposite back side, the display panel coupled to the mounting bracket; a cover substrate including a front side and a back side, the back side adjacent to the front side of the display panel; and a means for connecting the cover substrate and the display panel to the mounting bracket.

In Example 25, the subject matter of Example 24 optionally includes the means comprising a frame member made of one of a stainless-steel alloy, titanium, aluminum, reinforced glass fiber, carbon fiber, a ferritic stainless-steel, an austenitic stainless-steel, a duplex stainless-steel, a carbon steel, a galvanized carbon steel, an aluminum alloy, or a magnesium alloy.

In Example 26, the subject matter of any one or more of Examples 24-25 optionally include the means comprising a frame member having a front-to-back thickness between 0.5 millimeters and 7.5 millimeters.

In Example 27, the subject matter of any one or more of Examples 23-26 optionally include the means comprising a frame member having a cross-sectional area having a geometric shape of one of a circle, a rectangle, a square, an annulus, a square tube, and a rectangular tube.

In Example 28, the subject matter of any one or more of Examples 26-27 optionally include wherein a second moment of area of the frame member is between about 18 millimeters quartic to about 200 millimeters quartic.

In Example 29, the device or method of any one or any combination of Examples 1-28 can optionally be configured such that all elements or options recited are available to use or select from.

The above detailed description includes references to the accompanying drawings, which form a part of the detailed description. The drawings show, by way of illustration, specific embodiments in which the invention can be practiced. These embodiments are also referred to herein as "examples." Such examples can include elements in addition to those shown or described. However, the present inventors also contemplate examples in which only those elements shown or described are provided. Moreover, the present inventors also contemplate examples using any combination or permutation of those elements shown or described (or one or more aspects thereof), either with respect to a particular example (or one or more aspects thereof), or with respect to other examples (or one or more aspects thereof) shown or described herein.

In the event of inconsistent usages between this document and any documents so incorporated by reference, the usage in this document controls.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In this document, the terms "including" and "in which" are used as the plain-English equivalents of the respective terms "comprising" and "wherein." Also, in the following claims, the terms "including" and "comprising" are open-ended, that is, a system, device, article, composition, formulation, or process that includes elements in addition to those listed after such a term in a claim are still deemed to fall within the scope of that claim. Moreover, in the following claims, the terms "first," "second," and "third," etc. are used merely as labels, and are not intended to impose numerical requirements on their objects.

The above description is intended to be illustrative, and not restrictive. For example, the above-described examples (or one or more aspects thereof) may be used in combination with each other. Other embodiments can be used, such as by one of ordinary skill in the art upon reviewing the above description. The Abstract is provided to comply with 37 C.F.R. § 1.72(b), to allow the reader to quickly ascertain the nature of the technical disclosure. It is submitted with the understanding that it will not be used to interpret or limit the scope or meaning of the claims. Also, in the above Detailed Description, various features may be grouped together to streamline the disclosure. This should not be interpreted as intending that an unclaimed disclosed feature is essential to any claim. Rather, inventive subject matter may lie in less than all features of a particular disclosed embodiment. Thus, the following claims are hereby incorporated into the Detailed Description as examples or embodiments, with each claim standing on its own as a separate embodiment, and it is contemplated that such embodiments can be combined with each other in various combinations or permutations. The scope of the invention should be determined with reference to the appended claims, along with the full scope of equivalents to which such claims are entitled.

The invention claimed is:

1. An automotive display module comprising:
    a mounting bracket securable to a component of an automobile;
    a display panel including a front side and an opposite back side, the display panel coupled to the mounting bracket;
    a cover substrate including a front side and a back side, the back side adjacent to the front side of the display panel, wherein the cover substrate is a glass article having a thickness of 0.4 mm to 1.5 mm;
    a frame member connected to the back side of the cover substrate, the frame member substantially surrounding a periphery of the display panel, wherein the frame member is a component of a frame that defines an opening through the thickness of the frame, the opening extending from a front surface of the frame to a rear surface of the frame, so that the display panel can be positioned in the opening after the frame is attached to the cover substrate, wherein a second moment of area of the frame member is between about 18 millimeters quartic to about 200 millimeters quartic;
    a housing enclosing the back side of the cover substrate and secured to the frame; and
    one or more ribs securable to a backside of the frame member to reinforce the frame member, wherein the one or more ribs are positioned around a periphery of the housing.

2. The automotive display module of claim 1, wherein the cover substrate is adhered to the frame with an adhesive.

3. The automotive display module of claim 1, wherein the cover substrate includes a three-dimensional cold-formed glass.

4. The automotive display module of claim 1, further comprising a first fastener securing the frame member to the housing, the first fastener configured to reduce forces transferred from the frame member to the housing by deforming to dissipate energy created by an impact to the cover substrate.

5. The automotive display module of claim 4, further comprising a second fastener securing the bracket to the housing, the second fastener configured to reduce forces transferred from the bracket to the housing by deforming to dissipate energy created by the impact to the cover substrate.

6. The automotive display module of claim 5, wherein the first fastener and the second fastener are made of plastic.

7. The automotive display module of claim 1, wherein the frame member is made of one of a stainless-steel alloy, titanium, aluminum, reinforced glass fiber, carbon fiber, a ferritic stainless-steel, an austenitic stainless-steel, a duplex stainless-steel, a carbon steel, a galvanized carbon steel, an aluminum alloy, or a magnesium alloy.

8. The automotive display module of claim 1, wherein the frame member has a front-to-back thickness between 0.5 millimeters and 7.5 millimeters.

9. The automotive display module of claim 1, wherein the frame member has a cross-sectional area having a geometric shape of one of a circle, a rectangle, a square, an annulus, a square tube, and a rectangular tube.

10. The automotive display module of claim 1, wherein the bracket is coupled to the frame member.

11. The automotive display module of claim 1, wherein the frame member includes stamping to reinforce the frame member.

12. A method of manufacturing an automotive display module, the method comprising:
    forming a frame member that is a component of a frame that defines an opening through the thickness of the frame, wherein a second moment of area of the frame member is between about 18 millimeters quartic to about 200 millimeters quartic;
    applying an adhesive to a front side of the frame member, wherein the opening extends from a front surface of the frame to a rear surface of the frame;
    securing a cover substrate to the front side of the frame member using the adhesive, wherein the cover substrate is a glass article having a thickness of 0.4 mm to 1.5 mm;
    positioning a display panel adjacent to a back side of the cover substrate in the opening, wherein the frame member substantially surrounds a periphery of the display panel and the securing the cover substrate to the front side of the frame member can occur before the positioning of the display panel;
    securing a housing to the frame, wherein the housing encloses a back side of the cover substrate;
    securing one or more ribs to a backside of the frame member to reinforce the frame member, wherein the one or more ribs are positioned around a periphery of the housing; and
    securing the frame, the display panel, and the cover substrate to a component of an automobile.

13. An automotive display module comprising:
    a mounting bracket securable to a component of an automobile;
    a display panel including a front side and an opposite back side, the display panel coupled to the mounting bracket;
    a cover substrate including a front side and a back side, the back side adjacent to the front side of the display panel, wherein the cover substrate is a glass article having a thickness of 0.4 mm to 1.5 mm;
    a means for connecting the cover substrate and the display panel to the mounting bracket, the means comprising a frame member having a front-to-back thickness between 0.5 millimeters and 7.5 millimeters, wherein the frame member is a component of a frame that defines an opening through a thickness of the frame extending from a front surface of the frame to a rear surface of the frame, so that the display panel can be positioned in the opening after the frame is attached to the cover substrate, the frame member substantially surrounding a periphery of the display panel, wherein a second moment of area of the frame member is between about 18 millimeters quartic to about 200 millimeters quartic;

a housing enclosing the back side of the cover substrate and secured to the frame; and one or more ribs securable to a backside of the frame member to reinforce the frame member, wherein the one or more ribs are positioned around a periphery of the housing.

14. The automotive display module of claim 13, wherein the means comprising a frame member made of one of a stainless-steel alloy, titanium, aluminum, reinforced glass fiber, carbon fiber, a ferritic stainless-steel, an austenitic stainless-steel, a duplex stainless-steel, a carbon steel, a galvanized carbon steel, an aluminum alloy, or a magnesium alloy.

15. The automotive display module of claim 13, wherein the means comprising a frame member having a cross-sectional area having a geometric shape of one of a circle, a rectangle, a square, an annulus, a square tube, and a rectangular tube.

* * * * *